United States Patent
Bersted et al.

[11] Patent Number: 6,129,879
[45] Date of Patent: Oct. 10, 2000

[54] PROPYLENE POLYMER FIBERS AND YARNS

[75] Inventors: Bruce Howard Bersted, Alpharetta; Richard Tutt Norris, Jr., Hazlehurst; Leonid Slutsker, Douglasville; Ty Jackson Stokes, Suwanee, all of Ga.

[73] Assignee: BP Amoco Corporation, Chicago, Ill.

[21] Appl. No.: 09/447,989

[22] Filed: Nov. 23, 1999

Related U.S. Application Data

[63] Continuation of application No. 08/928,384, Sep. 12, 1997.
[60] Provisional application No. 60/026,151, Sep. 16, 1996.

[51] Int. Cl.[7] .................................................... B29C 47/78
[52] U.S. Cl. ............................... 264/211.14; 264/211.15; 264/211.17; 264/211.2; 264/211.21; 264/211.22; 264/211.1; 264/211.12; 156/167; 8/531; 8/115.5; 8/495
[58] Field of Search ........................ 264/211.15, 211.17, 264/211.21, 211.2, 211.1, 211.13, 211.12, 211.22; 8/115.51, 531, 115.7, 115.54, 495, 494; 156/167

[56] References Cited

U.S. PATENT DOCUMENTS

| | | | |
|---|---|---|---|
| 3,296,681 | 1/1967 | Lopatin | 28/72 |
| 3,424,834 | 1/1969 | Chopra et al. | 264/168 |
| 4,159,297 | 6/1979 | Mackie et al. | 264/151 |
| 5,587,118 | 12/1996 | Mallonee | 264/78 |
| 5,597,650 | 1/1997 | Mallonee | 428/370 |
| 5,620,797 | 4/1997 | Mallonee | 428/373 |

OTHER PUBLICATIONS

Genesis Carpet Certified By Amoco—Amoco Fabrics and Fibers Promotional Literature, 1988.

Forbes, Aug. 7, 1989, Science & Technology, Polypropylene Strikes Back.

*Primary Examiner*—Merrick Dixon
*Attorney, Agent, or Firm*—Stephen L. Hensley

[57] ABSTRACT

Process for treating a textile product comprising propylene polymer fibers comprises heating the textile product with the fibers in a substantially relaxed state at at least one temperature that is below the melting point of the propylene polymer but no more than about 20° C. below such melting point. In one embodiment, the propylene polymer fibers subjected to such heating are characterized by a particular crystalline microstructure as determined by small angle X-ray diffraction. In another embodiment, the propylene polymer fibers subjected to such heating are melt spun, oriented fibers heated at at least one lower temperature.

23 Claims, 3 Drawing Sheets

PROPYLENE POLYMER FIBERS AND YARNS

This is a continuation of application Ser. No. 08/928,384 filed Sep. 12, 1997 which in turn claims the benefit of U.S. Provisional Application No. 60/026,151 filed Sep. 16, 1996 now abandoned.

FIELD OF THE INVENTION

This invention relates to propylene polymer fibers and yarns, articles of manufacture comprising the same, and manufacture thereof.

BACKGROUND OF THE INVENTION

Polypropylene fibers and yarns are well-known and are widely used in textile and other applications owing to a desirable combination of features. These include low cost, ease of processing, strength, chemical inertness and hydrophobicity. Examples of textile applications for the fibers and yarns include backing fabrics and pile or face yarns for carpets; upholstery fabrics; geotextile fabrics; walk over fabrics; automotive fabrics, such as carpets, trunk liners and kick panels; diaper cover stock; and apparel fabrics.

There is, and has long been, a need for improved polypropylene fibers and yarns for use in applications in which the fibers, yarns or textile products containing them are subjected to bending, creasing, wrinkling, compression and the like. Examples include apparel fabrics, fiberfill, carpets, upholstery fabrics and automotive fabrics. Poor resilience of fibers and yarns used in such applications can result in limited recovery from forces to which fibers and yarns are subjected in use and, in turn, poor aesthetics and wear. These may limit or even preclude utility for certain end uses.

A practical example of the impact of resilience on utility of fibers and yarns for a given purpose is provided by experience in the United States carpet industry. Deficient resilience of carpet face yarn leads to poor thickness retention and recovery of pile height after application of compressive forces, such as those resulting from foot traffic and placement of furniture. Other things being equal, carpet with less resilient face yarn will take on a matted and clumped appearance, show wear and need to be replaced more rapidly and to a greater extent than that tufted with more resilient yarns. Similarly, depressions caused by placement of furniture or other objects will recover more slowly, if at all, in carpets with face yarn of low resilience.

These problems have long been recognized and many attempts at solving them have been advanced over the years. Modified polymer compositions and crystallinities have been proposed by polymer producers. Enhanced fiber spinning processes and yarn treatments have been explored by yarn manufacturers. Carpet manufacturers have developed modified carpet constructions. Despite these efforts and advances resulting from some of them, the long felt need for polypropylene fibers and yarns of improved resilience continues. Indeed, despite a combination of cost, colorfastness, stain resistance, mold and mildew resistance and ease of cleaning that is superior to other carpet face yarns, commercial success of polypropylene yarns in the carpet industry has been elusive. The yarns account for only about 25% of overall carpet face yarn usage and considerably less in residential carpets.

In greater detail, carpet sales in the United States in 1992 were about 1.25 billion square yards according to the Carpet & Rug Institute. Of that total, about 65% was so-called residential carpet, e.g., for housing. The balance was so-called commercial carpet, e.g., for office buildings, schools, stores and airports. Major face yarn types currently used for both types of carpet are nylon yarns, normally composed of polyepsilon-caprolactam or polyhexamethylene adipamide, also known as nylon 6 and 66, respectively; polyester yarns, normally composed of polyethylene terephthalate; and polypropylene yarns, typically composed of crystalline homopolymer polypropylene. In 1993, according to *Carpet & Rug Industry Review,* October, 1993, total United States carpet face yarn sales were about 2.9 billion pounds, with nylon yarns accounting for about 65%, polypropylene yarns accounting for about 25%, and polyester yarns accounting for about nine %. Wool, cotton and other yarns accounted for less than one %.

Nylon yarns are and have been the dominant synthetic face yarns for both residential and commercial carpets. However, polypropylene yarns' usage in commercial carpets has increased from essentially nothing in the late 1970's to about 40% as of 1992. This growth can be attributed to a combination of factors. One is the superior performance characteristics noted above. In addition, polypropylene yarns typically are less costly than nylon yarns, not only in cost per unit weight of yarn, but even more so in cost per unit area of coverage, because, for a given yarn type, polypropylene yarns have lower density than nylon yarns. The volume of a given weight of polypropylene yarn exceeds that of the same weight of nylon yarn; accordingly, polypropylene yarns provide greater coverage per unit weight and, in turn, per unit cost. Also contributing to the growth in acceptance of polypropylene yarns are various yarn configurations and features of carpet construction developed over the years that compensate to some extent for the yarns' lower resilience.

In the area of carpet manufacture, elements of construction that compensate somewhat for poor resilience include so-called loop pile constructions, low pile heights and high tuft densities. In loop pile constructions, face yarn tufts that form the carpet's pile surface are left uncut, such that the tufts are disposed in loops on the pile surface. Other things being equal, looped tufts have greater resistance to compression and better recovery than cut pile tufts. Low pile height limits the effect of compressive forces, in any event, by providing shorter tufts to compress. High tuft density, that is, many tufts per unit area of pile surface, makes for close spacing of tufts to one another such that the tufts and their fibers provide support to neighboring tufts and fibers to thereby resist and recover from compression.

In terms of yarn configuration, twisted yarns normally are more resilient than untwisted yarns, with tighter twist and greater twist retention providing greater resilience, other things being equal. Levinstein, *The Complete Carpet Manual,* 1992, pp. 44–45. It is also known that twist retention can be improved by subjecting yarns to bulking treatments, such as texturizing with fluid jets or crimping, before or after twisting. Those treatments are normally conducted primarily to impart bulkiness and texture to yarns by creating whirls, loops, entanglements, waviness, kinks and crimp in their filaments. Through such interaction of the textured filaments, twist retention in twisted yarns, as well as resilience of even untwisted yarns, are typically improved. Heatsetting often is employed to set, or lock in, twist and bulk. As an example of these types of yarn configurations, U.S. Pat. No. 4,290,378 (1981) of Monsanto discloses "bulky, loopy, heatset, tangled, twisted singles yarn" which may be composed of polyamides (nylons), polyolefins, polyesters and polyacrylonitriles. The yarns are said to have exceptional column strength, resistance to bending and untwisting and to be useful in cut and loop pile carpets. So-called blended yarns, made up of filaments of greater and lesser resilience, e.g., nylon and polypropylene, also have been proposed for the purpose of obtaining yarns with greater resilience than that of yarns composed entirely of the less resilient filaments, as noted in U.S. Pat. No. 3,295,308 (1967) of Eastman Kodak. Yarns composed of so-called bicomponent fibers, such as sheath-core fibers having a core of nylon surrounded by a sheath of polypropylene, also have been proposed as a means to combine the resilience of nylon with the superior properties of polypropylene in other respects.

As a result of some of these yarn configurations and carpet constructions, together with polypropylene yarns' price and performance advantages, polypropylene yarns have gained in acceptance as face yarn for commercial carpets. Of course these techniques do not improve resilience of polypropylene fibers per se, nor do they significantly close the gap between nylon and polypropylene in terms of fiber resilience or pile height recovery of tufted carpets. Rather, both types of yarns benefit from use of carpet construction, yarn configuration within a carpet and fiber-to-fiber interaction within yarn tufts to improve crush resistance. Despite growth in acceptance of polypropylene yarns for commercial carpet, nylon yarns remain dominant.

In residential carpets, the cost and performance advantages of polypropylene yarns over nylon yarns also would be beneficial. As in the case of commercial carpets, superiority of polypropylene yarns over nylon yarns for residential carpets, except in terms of crush resistance, has been widely recognized. *Chicago Tribune,* Nov. 21, 1993, section 15, page 6. However, in this application, unlike commercial carpets, carpet construction is less useful for masking lower resilience. Loop pile surfaces and low pile heights, while effective and aesthetically satisfactory in commercial carpets, do not provide the plush, luxurious look and feel preferred by homeowners and are seldom used in residential carpets. High tuft density does contribute to a luxurious appearance. However, taken together with the normally greater pile heights of residential carpets, tuft densities high enough to improve compressional recovery due to the supporting effect of adjacent yarns and fibers are so high that they tend to limit utility of polypropylene yarns as face yarn to relatively heavy carpets, e.g., 40 or more ounces per square yard, at the expensive, upper end of the range of commercially available styles and weights.

From 1986 to 1992, the share of polypropylene yarns used as residential carpet face yarn did increase to about five %. Impetus for the increase was provided by Amoco Fabrics Company's Genesis™ Carpet certification program. As reported in "Polypropylene Strikes Back," *Forbes,* Aug. 7, 1989, page 122, resilience of Genesis™ Carpets was attributed to twisting continuous filament yarns composed of polypropylene fibers and setting the twisted yarns with heat, together with establishing minimum weight and density specifications and optimized tufting patterns for carpets. The program was limited to the premium end of residential carpets, in part to maximize the resilience benefits of high tuft density, but also in an attempt to dispel polypropylene yarns' image as unsuitable for carpet face yarn or suited only for "low-end" carpets. Despite being so-targeted, and despite receiving considerable advertising and promotional support, the program was discontinued in 1992 because demand for the yarns did not meet expectations. At present, polypropylene yarns' use as face yarn for residential carpet is minimal.

Thus, despite both lower cost and superior performance in a number of respects, polypropylene yarns' growth as face yarn for carpets has been and continues to be hampered by its low resilience. In residential carpets, polypropylene yarns account for only a meager portion of total face yarn. Even in commercial carpets, the acceptance achieved by polypropylene yarns has been the subject of skepticism. Investext™, No. 1127564, p. 6 (Jun. 1, 1991).

Beyond particular yarn configurations and modified carpet constructions, attempts to improve polypropylene fiber resilience per se have been reported over the years. It must be recognized, however, that carpet thickness retention and pile height recovery from compressive forces involve complicated interplays among carpet construction, fiber-to-fiber interactions within and among yarn tufts, and fiber and yarn structures, properties and configuration. Furthermore, the bending forces to which carpet fibers and yarns are subjected during normal use normally involve nonuniform compression and stretching of yarn tufts and their fibers; results of yarn testing typically correlate only loosely, if at all, with actual carpet performance. In addition, many properties of fibers and yarns, including not only physical properties but also aesthetics such as appearance and hand, tend to develop over the entire course of their manufacture, including spinning, drawing, and, if conducted, bulking and heatsetting or annealing. Consequently, attempts to improve properties by changing a given process step may require compromises in one or more other steps and/or properties to achieve a balance of overall yarn properties and process efficiency. In view of these factors, it will be appreciated that improvements in fiber properties or manufacture often are difficult to translate into improved carpet performance and that the broad range of interrelationships among fiber and yarn manufacture, their configurations and properties, and carpet performance makes attainment of improved carpet performance through fiber and yarn modifications imprecise and unpredictable. This is aptly demonstrated by prior art related to heat treating or annealing treatments aimed at polypropylene fibers and yarns.

In an early patent to DuPont, U.S. Pat. No. 3,152,380 (1964), the problem of deficient resilience of polypropylene fibers and its negative impact on their use as carpet yarns and stuffing was recognized and a two step process of drawing and heatsetting fibers was proposed as a solution. The patent proposes drawing "as-spun" fibers, defined as fibers as they first solidify on emergence from a spinneret, at a draw ratio of at least 1.5:1, preferably 3:1 to 10:1, and a temperature of at least 80° C., and then heating the drawn fibers in an untensioned state at a temperature of at least 140° C. but below the melting point of the fibers for at least one second. Compressional recovery of the fibers, calculated from recovered height of a yarn plug 24 hours after a one minute exposure to a 10,000 psi load relative to height of the initial plug compressed by a sixteen gram wooden dowel, is described as at least 65%, with values of 65–100% (as opposed to 15–20% for untreated fibers) reported in the patent's examples. The patent also notes that recoveries generally increase with increasing heat treatment temperatures. However, in contrast to improvements reported in the patent's yarn testing examples, carpet testing results show far less improvement (15–20%) as well as accelerated loss of pile height retention at higher levels of foot traffic for treated carpet as compared to untreated carpet. The patent's treated yarns with high compressional recoveries also show excessive shrinkages (30–54%) and, as seen from a comparative example using nylon yarn, even the best of the treated polypropylene yarns had a compressional recovery (100%) of only about two-thirds that of untreated nylon yarn (154%) by the patent's test.

D. R. Buchanan, "Elastic Deformation And Fiber Structure In Polypropylene," date and source unknown, presents comparisons of as-spun, hot-drawn and annealed polypropylene fibers in terms of molecular orientation, crystal structure and tensile recovery. The author's conclusion is that extremely high levels of elastic recovery from large tensile strains were exhibited by fibers annealed for 30 minutes at 127 to 154° C., either under sufficient tension to maintain constant length or relaxed, and that this could be attributed to significantly improved regularity of the supermolecular structure of the fibers, including highly regular crystallite shape and minimum crystal length of 140–150 Å. The annealed fibers reported by Buchanan exhibited tensile recoveries from 30% extension of 91–96%, as compared to 68–86% for hot-drawn fibers and 56–72% for as-spun fibers. Similarly, U.S. Pat. No. 3,256,258 (1966) of DuPont attempts to correlate crystalline structure of polypropylene fibers with improvements in recovery from tensile forces. More specifically, the patent discloses tensile recoveries at 25% elongation of at least 82% in respect of polypropylene fibers characterized by gamma orientation, as indicated by a gamma intensity ratio greater than 0.6, and a heat stable orientation angle of 10° to 30°. Fibers having such features are said to be prepared by melt spinning filaments under conditions vaguely defined as those that afford actual or potential gamma orientation, orienting the filaments to an extent that provides an orientation angle of 10° to 55° and heat treating the filaments at 105–160° C., with 130–140° C. reported to give best results.

While the Buchanan paper and the DuPont '258 patent report improved recoveries from large tensile strains as a result of annealing, neither purports to investigate effects of those improvements on carpet performance. In any event, improved tensile recovery does not lead to or suggest improved resilience because tensile recovery testing measures recovery from stretching or extension while resilience of fibers and yarns depends on bending and compressional recovery. In this regard, the long-recognized superiority of nylon carpet face yarns over polypropylene carpet face yarns in terms of resilience stands in sharp contrast to published works showing that polypropylene yarns are better than nylon yarns in comparative tensile recovery testing. J. C. Guthrie, "The Bending Recovery Of Various Single Fibres," Textile Institute Paper presented to the Textile Institute Physics Group Conference, April, 1970, pp. 615–627. Guthrie reports poor correlation between tensile and bending recoveries for both nylon and polypropylene yarns as does B. M. Chapman, "Bending Stress Relaxation and Recovery of Wool, Nylon 66, and Terylene Fibers," *J. Appl. Sci.,* Vol. 17, pp. 1673–1713, 1975. Guthrie also reports that the relatively low bending recoveries of "as-received" polypropylene fibers reflect their poor carpet performance and stand in contrast to the "much higher" elastic-recovery values obtained by measuring tensile recovery. It follows that the increased tensile recoveries of the heat treated polypropylene yarns reported in Buchanan and the DuPont '258 patent are not predictors of improved resilience of fibers and yarns or of better compressional recovery of carpets.

Guthrie also reports bending recoveries for polypropylene fibers in "as-received" condition; in so-called "straightened" condition with crimp removed by five minutes of heating at 120° C. under tension sufficient to approximately straighten the fibers; and straightened and then relaxed by immersion in water at 95° C. for fifteen minutes. Recoveries one minute and one day after bending are reported as 60.1% and 74.4%, respectively, for straightened fibers, 52.1% and 59.2%, respectively, for straightened and relaxed fibers and 32.0% and 39.1%, respectively, for as-received fibers. Recoveries after repeated bendings also are reported, with straightened fibers routinely showing better recovery than the crimped, as-received ones by 19–35%.

In contrast to Guthrie's teaching that heat treating polypropylene yarns under tension to remove crimp improves bending recovery over that of the untreated, crimped fibers, U.S. Pat. No. 3,686,848 (1972) and its counterpart British Patent Specification 1,384,121 (1975), both to Uniroyal, Inc., are directed to deliberately imparting, and heat treating to permanently set, a particular crimp to obtain polypropylene yarns of improved resilience in terms of ability to recover original dimensions after release of compressive stress. The yarns are said to be characterized by an essential combination of properties that includes textured tenacities of less than 2.5 grams per denier, so-called "crimp permanence" of 20–70, filaments having 6–20 crimps, other than helical or sharp edge angular crimps, per inch, with at least 75% of the crimps being arcuated, three-dimensional crimps, and at least 80% of the filaments exhibiting substantially no plastic deformation. According to these Uniroyal references, the improved polypropylene yarns are prepared by melt spinning polypropylene resin into filaments, bringing the filaments together to form yarn, drawing the yarn at a draw ratio, defined as ratio of drawn length to undrawn length, below 2.5:1 according to the U.S. patent or 3:1 according to the British specification, crimping the yarn as described above and permanently setting the crimp by heat treating the yarn with a minimum of tension in a highly compacted state at 121° C. to just below the softening point of the filaments (desirably at 129–138° C.; 146° C. is the highest temperature reported) for a time sufficient to permanently set the crimp (15 minutes is the only time period quantified). Examples 3 and 4 of each patent present results of simulated and actual traffic testing of level loop carpets tufted with such yarns. In example 3, carpets tufted with such yarns and with nylon yarns, each of 4000 denier, and commercially available level loop carpet tufted with standard 4000 denier polypropylene yarns were tested by measuring pile heights after repeated compressions by application of seven psi over an area 1¼ inch in diameter at a rate of 1380 cycles per hour, with percent matting calculated as a percent of initial pile height represented by pile height at unspecified times after various numbers of cycles. The nylon- and heatset, high crimp permanence polypropylene-tufted carpets were comparable, with both somewhat better than the commercial polypropylene carpet, after 1000 and 3000 cycles. Nylon was slightly better than the heatset, high crimp permanence polypropylene, and both were somewhat better than commercial polypropylene, after 10,000 and 20,000 cycles. Actual carpet testing reported in example 4 is described as showing criticality of the combination of tenacity, draw ratio, crimp permanence and heatsetting in achieving improved resilience; however, a comparative carpet sample tufted with polypropylene yarns prepared with low crimp permanence and without heatsetting is reported to have performed almost as well as a heatset, high crimp permanence sample. As with the DuPont '380 patent, the improved yarn performance reported in these Uniroyal patents far exceeds any demonstrated improvement in carpet performance.

Polypropylene fibers of improved resilience in terms of height of recovery of yarn plugs from compression are reported in U.S. Pat. No. 3,680,334 (1972) to Erickson and Buchanan, in Canadian Patent 957,837 (1974) to Newton and Buchanan (in both cases the same Buchanan who authored the paper discussed previously) and in European Patent Application 0,330,212 (1989) of Wishman et al., all originally assigned to Phillips Petroleum Company. In the two patents, resilience improvements are attributed to reordering of fiber crystal structure so that it is characterized by relatively intense diffraction in the fiber axis direction with maximum diffracted intensity at an angle of 20 minutes such that calculated value of long periods is at least 160 Å and calculated crystal length is 125–200 Å, preferably 140–160 Å, as determined by small angle X-ray diffraction. Very little additional resilience improvement is said to result from crystal lengths of 170 Å or higher. Reordering of fiber crystal structure is said to be achieved by treating fibers with saturated steam for 0.01–2 seconds under tension at 10–35° C. below the melting temperature of the polymer constituting he fibers, and, in the case of polypropylene homopolymer, preferably at 135–160° C. Short treatment times are said to be necessary because they favor local melting and reorganization of zones of crystal imperfection and because longer treatment times promote soiling of the fibers and yarns and carpets made therefrom. Heating of polypropylene fibers in an air oven for 30 minutes to an hour at 150° C. is also said to give the same crystal size and general structural characteristics but with greatly deteriorated resistance to soiling. In addition to compressional recovery of yarn plugs, the Canadian patent reports thickness retention of loop pile carpets tufted with its treated yarns and comparative, untreated yarns. In a dramatic illustration of the difficulty in translating yarn properties to carpet performance, Table I of the patent shows treated yarns with two-to-three times greater plug height recovery than the untreated yarn (0.636 inch vs. 0.244 inch) but carpet testing results in Table II show so little improvement in performance (80% vs. 76%) as to be of virtually negligible effect.

Still in search of fibers and yarns with improved resilience some fifteen to twenty years after the Erickson, Newton and Buchanan patents discussed above, Phillips' 1989 Wishman et al. application proposes yet another solution. Wishman et al. is directed to resilient polypropylene fibers, said to be suitable for carpets and upholstery, prepared by spinning and drawing polypropylene fibers under conditions that produce sufficient crystallinity to withstand subsequent heat treatment, including a draw ratio of at least 3:1, imparting to the fibers a sharp edge angular or so-called two-dimensional type crimp, and heat treating the fibers to permanently set the crimp. (It will be noted that Wishman et al.'s minimum draw ratio of 3:1 exceeds or equals the maximum draw ratio according to the previously discussed Uniroyal references; they also set mutually exclusive requirements for crimp configurations.) Heat treating is conducted at about 280° F. (138° C.) to just below the softening point of the fibers, reported as 320–329° F. (160–165° C.), and preferably at about 284° F. to about 315° F. (140–157° C.), for a time ranging from five seconds to eight minutes depending on heat transfer capability of the heat treating system and openness of the fiber bundle. Unlike the earlier patents to Phillips, Wishman et al. does not attribute improvements to changes in fiber crystal structure but, rather, to permanently setting a particular crimp in the fibers. Staple fiber prepared according to Wishman et al. has achieved some measure of success, particularly in certain automotive applications, such as door panel fabrics, and for certain apparel fabrics. Indeed, in the apparel field, spun yarns composed of such staple fibers have been woven or knit, alone or with other spun and/or filament yarns, e.g. polyester, cotton, wool, nylon, other polypropylene yarns, to yield various woven fabrics, e.g., denims, hopsacks, twills, and knits, e.g. circular, warp, flatbed and sliver knits and knitted fleece, having beneficial and interesting characteristics. For example, woven and knit fabrics have been prepared from combinations of such spun yarns and cotton yarns to yield garment fabrics with improved comfort due to a so-called "push-pull" effect resulting from polypropylene's hydrophobicity and cotton's water absorbency and improved appearance retention resulting from bulk retention and resiliency of the polypropylene yarns. However, such yarns are not used in commercial or residential carpet nor have continuous filament yarns according to the reference met with commercial acceptance. Indeed, in the area of continuous filament yarn, Phillips discontinued its business, including carpet face yarn, by 1992 after a two year phaseout. *Spartanburg Herald Journal,* Nov. 2, 1991.

Improved resilience also was an aspect of the now-discontinued, Amoco Fabrics Company Genesis™ Carpet certification program that took place from 1988 until 1992. Genesis™ Carpet face yarns were made by melt spinning polypropylene homopolymer resin from delta-shaped spinning orifices, gathering the filaments into yarns, drawing the yarns at draw ratios of about 3.5:1, air jet-texturing the yarns to impart bulk and texture, twisting the yarns 4.5 twists per inch, steaming the yarns at 98° C. for 12 seconds and then locking in the twist by heatsetting at about 132° C. for 32 seconds. Resilience of Genesis™ Carpet face yarns tested according to the Plug Crush Recovery Test, a compressional recovery test described in detail hereinbelow, is about 75%. While this is on the high side of Plug Crush Recoveries of conventional polypropylene carpet face yarns, it still falls well short of nylon (Plug Crush Recovery =85–90%). After discontinuing the Genesis™ program, Amoco exited the carpet face yarn business. *Atlanta Constitution,* Sep. 26, 1992, Business Section, p. C3.

From the foregoing, it is evident that a variety of improved yarns and yarn manufacturing processes has been proposed or utilized, with a broad range of results reported. Reported improvements in resilience of yarns, when achieved, have been accompanied by severe losses of other important properties, including excessive shrinkage, development of fused or "crispy" surfaces, and texture, loss of hand and other aesthetic properties. In any event, such improvements as have been reported show little or no positive effect on carpet performance. Moreover, while heatsetting is a common feature of many prior proposals, it also can be seen that the combination of other process conditions and steps, e.g., heatsetting with or without tension, draw ratio, type and level of crimp, if any, and others, has a major influence on attainment of improved results. Noteworthy in this regard are Phillips' Wishman et al. European application and the Uniroyal references which report similar results yet set contradictory requirements for draw ratio and type of crimp. Adding to the confusion, the U.S. patent to Uniroyal and its British counterpart, while stressing criticality of various yarn properties and process features, do not even agree on maximum draw ratio. Further, in contrast to Wishman et al.'s and the Uniroyal references' attempts to utilize crimp to improve resilience, Guthrie reports better bending recovery for straightened fibers than for crimped fibers. Some of the proposals discussed above also purport to establish relationships between crystalline structure and physical properties; however, those that do so in the context of improved recovery from tensile deformations are unreliable as a guide for improving resilience because of the well-established lack of correlation between such properties. In any event, no two of the references even measure the same crystallinity parameters. Perhaps most significantly, despite availability of these proposals and their teachings and results, many for twenty-to-thirty years, polypropylene yarns' use as carpet face yarns remains limited due to resilience and two formerly significant propylene polymer carpet yarn producers, Amoco and Phillips, have left that business.

Other proposals for polypropylene fibers and yarns of improved resilience have been advanced over the years. U.S. Pat. No. 3,286,322 (1966), also to Phillips Petroleum Company, proposes immersing BCF polypropylene yarns in a bath of crosslinkable polyfunctional monomers and then exposing the monomer-saturated yarn to high energy radiation to crosslink the monomer and polypropylene and thereby improve resilience. Canadian Patent 787,824 (1968) of Union Carbide Corporation proposes polypropylene fibers having cross-sections with three sharp angles of less than 90° to distribute mass over greater area and away from the fiber axis, thereby increasing bending moment and, in turn, resilience of the fibers above that of round cross-sectioned filaments. Neither proposal was ever implemented in any commercial operation so far as is known.

Thus, despite the longstanding search for improved resilience, the variety of approaches pursued by the polymers, fiber and yarn, and carpet industries over the years, and propylene polymer yarns' superiority over other carpet yarns in virtually every respect other than resilience, the fact remains that propylene polymer yarns remain a distant second to nylon as carpet face yarns, especially in residential carpets. Judged by actual experience in the carpet industry, the proposals discussed above must be regarded as unsuccessful and the longstanding search and long felt need for propylene polymer fibers and yarns of improved resilience continue.

SUMMARY OF THE INVENTION

Briefly, this invention provides improved propylene polymer fibers and yarns and textile products comprising the same and a method for heat treating textile products, including fibers and yarns.

One aspect of the invention provides fiber comprising crystalline propylene polymer characterized by small angle X-ray diffraction such that an average of $$\frac{L}{1.03\tan\alpha} \times \sqrt{-\log\frac{I_m(\alpha)}{I_m(0)}}, \tag{1}$$

with the fiber positioned such that its longitudinal axis is inclined at angles, $\alpha$, of 10° and 20° from a perpendicular to the X-ray beam, is at least about 240 Å, wherein $I_m(0)$ is maximum intensity of small angle X-ray meridional reflection with the fiber positioned such that its longitudinal axis is perpendicular to the X-ray beam;

$I_m(\alpha)$ is maximum intensity of small angle X-ray meridional reflection with the fiber positioned such that its longitudinal axis is inclined at the angle, $\alpha$, from the perpendicular to the X-ray beam;

$$L = \frac{1.5418\text{Å}}{\phi_m}; \text{ and} \tag{2}$$

$\phi_m$ is an angular position, in radians, of the center of the small angle X-ray meridional reflection at half height relative to the center of the incident X-ray beam, with the fiber positioned such that its longitudinal axis is perpendicular to the X-ray beam;

and wherein the small angle X-ray diffraction is conducted with CuKα radiation having a wavelength of 1.5418 Å and the X-ray beam is slit collimated to a full angular width at half height of 1.81 angular minutes.

In another aspect, the invention provides yarns, and particularly continuous multifilament yarns, comprising such fibers.

In other aspects, the invention provides improved textile products, and particularly carpets and woven, knit and nonwoven fabrics, comprising such fibers and yarns.

According to another aspect of the invention, there is provided a process for treating a textile product comprising providing a textile product comprising fibers that comprise propylene polymer, and heating the textile product with the fibers in a substantially relaxed state at at least one temperature that is below but within about 20° C. of the melting temperature of the propylene polymer, wherein the fibers comprising propylene polymer are selected from the group consisting of (1) fibers characterized by small angle X-ray diffraction such that an average of $$\frac{L}{1.03\tan\alpha} \times \sqrt{-\log\frac{I_m(\alpha)}{I_m(0)}}, \tag{1}$$

with the fibers positioned such that their longitudinal axes are inclined at angles, $\alpha$, of 10° and 20° from a perpendicular to the X-ray beam, is at least about 200 Å, wherein $I_m(0)$, $I_m(\alpha)$, L, and the small angle X-ray diffraction are as defined above in connection with Formula (1); and (2) melt spun, oriented fibers that have been heated at at least one lower temperature ranging from about 20 to about 40° C. below the melting temperature of the propylene polymer with the fibers in a substantially relaxed state. According to a preferred embodiment of this aspect of the invention, there is provided a process for producing yarns comprising the steps of spinning molten thermoplastic resin comprising propylene polymer to form molten filaments, quenching the molten filaments, gathering the filaments, drawing the filaments at a draw ratio of about 1:1 to about 3.5:1, texturing the filaments, heating the filaments in a substantially relaxed state at at least one temperature in the range of about 20 to about 40° C. below the melting temperature of the propylene polymer, and thereafter heating the filaments in a substantially relaxed state at at least one higher temperature that is below but within about 20° C. of the melting temperature of the propylene polymer.

As used herein, the terms, "fiber" and "filament" refer to a single filamentary structure without regard to its length. The term "yarn" refers to a unitary structure composed of two or more fibers that are associated in such a manner as to constitute a single unit for purposes of further handling or processing such as winding onto bobbins or creels, weaving, tufting or knitting. The term "continuous filament" is used in the manner commonly accepted in the synthetic fiber art to refer to a fiber of substantial or indeterminate length. The expression "BCF yarn" is used in its commonly accepted context in the synthetic fiber art to refer generically to bulked continuous filament yarns; such yarns are multifilament yarns and the bulk can be of any type. The term "textile product" refers generally to fibers, yarns, fabrics, whether woven, nonwoven, knit or otherwise prepared, scrims and the like, as well as composite textile materials containing combinations of such products with each other or with other components. The expression "Plug Crush Recovery" refers to the percentage of initial height recovered by a one inch high yarn plug after compression and recovery according to the procedure described herein. For purposes of the following description of the invention, unless otherwise indicated, propylene polymer melt flow rates are determined according to ASTM D1238 Condition B and bulk levels of yarns are determined by measuring length of yarn in a fully bulked state and also extended to a completely unbulked state according to the procedure described herein and expressing the difference in lengths as a percentage of the fully bulked length. Also for purposes hereof, maximum intensities of meridional reflections, $I_m(\alpha)$ and $I_m(0)$, obtained by small angle X-ray diffraction are determined after separation of diffuse scattering and corrected by application of the Lorentz factor, both as described in detail below.

BRIEF DESCRIPTION OF THE DRAWING

Various aspects of the invention are described by reference to the accompanying Drawing, the six figures of which are as follows.

DETAILED DESCRIPTION OF THE INVENTION

Figure 1:
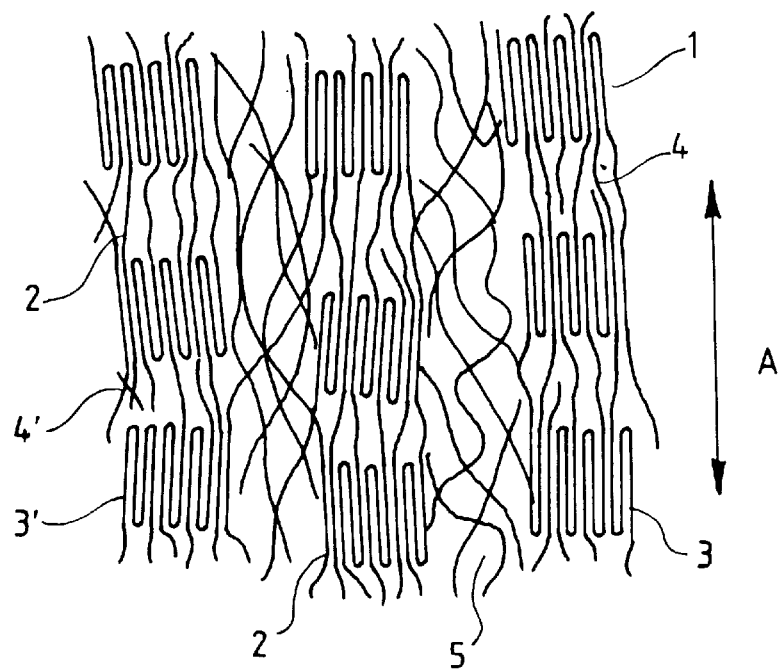
FIG. 1, a longitudinal cross-sectional view of a fiber composed of oriented crystalline polymer showing a conceptual representation of the fiber's crystalline microstructure.

In greater detail, this invention provides fibers comprising propylene polymer characterized by a unique crystalline microstructure as determined by the small angle X-ray diffraction method utilized herein. The invention also provides yarns comprising such propylene polymer fibers and, in a more specific embodiment, BCF yarns comprising such fibers and characterized by improved resilience. Such BCF yarns are especially useful as carpet face yarns for both commercial and residential carpets. Indeed, in controlled carpet walkout tests, carpets tufted with such yarns have exhibited resistance to clumping and matting considerably better than carpets tufted with conventional propylene polymer yarns and only slightly less apparent wear than those tufted with nylon yarns.

The invention also provides a method for heat treating textile products comprising fibers of crystalline propylene polymer comprising heating such products under particular conditions, including at least one temperature that is less than but within about 20° C. of the melting point of the propylene polymer. In one embodiment, heating is applied to textile products comprising oriented propylene polymer fibers that have been conditioned by heating at at least one lower temperature in the range of about 20 to about 40° C. below the propylene polymer melting point with the fibers in a substantially relaxed state. In another embodiment, heating within about 20° C. of the propylene polymer melting point is applied to fibers characterized by a particular crystalline microstructure as determined by the small angle X-ray diffraction method utilized herein. When applied to yarns predominantly comprising fibers of crystalline propylene polymer obtained by melt spinning, drawing and texturing under particular conditions, such heating can yield yarns having improved resilience as measured by the Plug Crush Recovery Test.

While the invention is described largely by reference to carpets and carpet face yarns, it will be understood that neither the invention nor utility thereof is to be considered so limited. Indeed, the invented fibers and yarns are useful not only in the wide range of textile products in which propylene polymer fibers and yarns have heretofore been used, but also, due to their improved properties, in other applications and especially those calling for greater recovery from compression, bending, creasing, wrinkling and the like. Examples of other textile products in which the invented fibers and yarns are useful include fiberfill, such as for cushions, pillows, stuffed toys, sleeping bags, quilted bedspreads, comforters and the like; highloft nonwoven fabrics, such as needlepunched batts, insulation and filtration fabrics; apparel yarns and woven and knit apparel fabrics, such as for socks, thermal underwear and outerwear; automotive fabrics, such as automotive carpet yarns, trunk liners and kick panels; upholstery fabrics, such as velvets and velours; geotextile fabrics; industrial fabrics; and technical fabrics.

The invention proceeds from the discovery that crystalline propylene polymer bulked, continuous multifilament yarns prepared by melt spinning, drawing, texturing and heatsetting under particular conditions exhibit Plug Crush Recoveries exceeding those of known, propylene polymer BCF yarns and superior recovery from compression when used as face yarns for tufted carpets. Through extensive morphological studies of these yarns and their fibers by wide- and small-angle X-ray diffraction, it was further discovered that values determined according to the relationship expressed in Formula (1) have a well-defined correlation to Plug Crush Recoveries. In addition, despite the difficulty in quantifying correlation between compressional recovery of yarn samples and results of compression testing of carpets, carpets tufted with the invented yarns show improved performance in actual walkout tests.

While the invention is not limited to or by theory in any aspect or embodiment, the following discussion of crystalline morphology-resilience relationships is provided insofar as it may contribute to an understanding of the invention. A morphological model for resilient fibers, including propylene polymer fibers, is not presently known; however, models for oriented fibers of flexible chain crystalline polymers have been advanced. A. Peterlin, *J. Material Sci.* 6, 490 (1971) presents a model for fibers of polyethylene and polypropylene oriented by cold drawing, proposing a fiber microstructure composed of microfibrils generally aligned in the direction of the fiber axis and made up of crystalline and less crystalline, or amorphous, regions alternating regularly along the fiber axis, with adjacent microfibrils separated axially by regions of amorphous polymer and so-called tie molecules interconnecting crystalline regions of different microfibrils. Peterlin reports that electron microscope measurements indicate diameters of microfibrils of a few hundred angstroms and lengths of tens of microns. The author also reports that annealing of the cold-drawn fibers tends to shorten and thicken the microfibrils, attributing the latter to bringing together of the crystalline regions of different microfibrils due to contraction of the tie molecules. Neither the extent of the changes nor annealing conditions effective to obtain them are reported. Peterlin notes that orientation by hot drawing results in several differences in fiber properties and structure as compared to the cold drawn fibers that were the subject of his study. The model is discussed further in A. Peterlin, *Copolymers. Polymers And Composites*, N.A.J., pp. 1–13 (1975). Related models for nylon and polyethylene terephthalate fibers are presented in Prevorsek et al., *J. Macromol. Sci.-Phys.*, B12(4), 447–485 (1976); Prevorsek et al. *J. Macromol. Sci.-Phys.*, B9(4), 733–759 (1974); and Prevorsek et al., *J Macromol. Sci.-Phys.*, B8(1–2), 127–156 (1973), although the latter emphasizes that a model descriptive of the structure and properties of polyethylene and polypropylene fibers cannot be applied to polyethylene terephthalate and nylon fibers.

Figure 2:
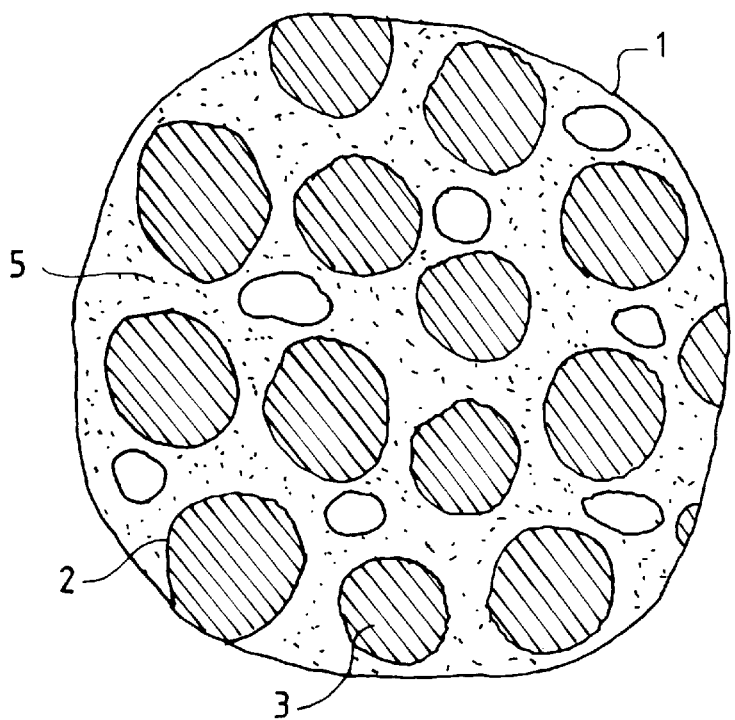
FIG. 2, a transverse cross-sectional view of the fiber depicted in FIG. 1, again showing conceptualized crystalline microstructure.

FIGS. 1 and 2 depict longitudinal and transverse cross sections of a fiber showing conceptual microstructure based on an interpretation of oriented fiber models. As shown in FIG. 1, fiber 1 has microfibrils 2 disposed substantially parallel to fiber axis A. Microfibrils include crystalline regions 3 and intercrystalline amorphous regions 4. Also shown are interfibriller amorphous regions 5. Microfibrils 2 are also seen in FIG. 2, with interfibriller amorphous regions 5 also shown. Referring again to FIG. 1, crystalline region 3' and the intercrystalline amorphous region designated 4' make up a long period.

In the context of the preceding discussion and FIGS. 1 and 2, X-ray diffraction permits measurement of various elements of microfibrillar structure or measurements from which their apparent dimensions can be calculated or estimated, including average microfibril diameter, long periods, dispersion of long periods, total fiber crystallinity, fibril crystallinity, transverse crystallinity, longitudinal and lateral sizes of crystallites and orientation of crystallites. From Formula (1) above, which is derived from M. A. Gezalov et al., *J. Polymer Sci.* USSR, A12, 2027 (1970) (translated from *Vysokomol. soyed.* A12, 1787 (1970)) and discussed further below, average microfibril diameter can be calculated from parameters measured by small angle X-ray diffraction. Accordingly, again in the context of the foregoing discussion, Formula (1) above can be considered to establish for propylene polymer fibers according to the invention a calculated value for average microfibril diameters of at least about 240 Å. For convenience, values calculated according to Formula (1) are sometimes referred to herein as "Apparent Average Microfibril Diameters."

Figure 3:
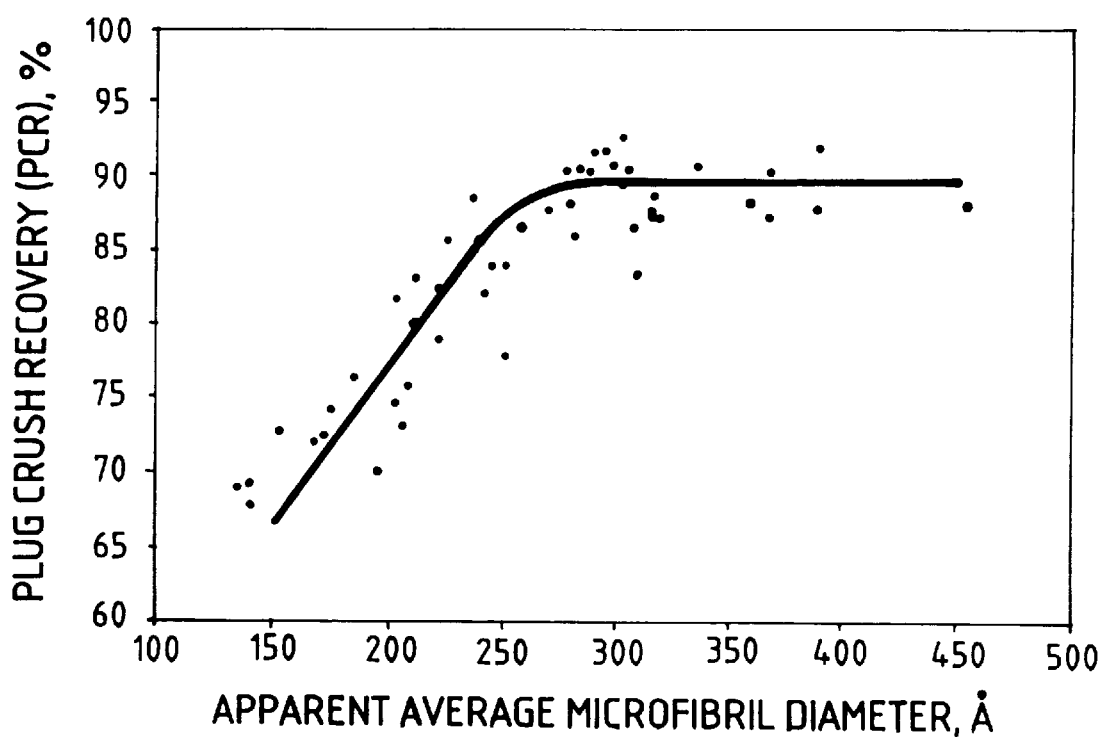
FIG. 3, a plot of Plug Crush Recoveries of yarn samples against the values calculated according to Formula (1) from small angle X-ray diffraction measurements from samples of the yarns.

In contrast to the Apparent Average Microfibril Diameters of the invented fibers, known propylene polymer fibers used as carpet yarn generally have considerably lower Apparent Average Microfibril Diameters based on analyses using the small angle X-ray diffraction techniques utilized herein. Again in the context of the foregoing theoretical discussion, it may be postulated that improved resilience of the invented fibers and yarns is attributable to greater compressional or bending recovery imparted by the larger diameter of the microfibrils. This hypothesis finds support in the plot of Plug Crush Recovery against Apparent Average Microfibril Diameter in FIG. 3. As seen from that figure, Plug Crush Recovery increases with increasing Apparent Average Microfibril Diameter from about 125 Å to almost 300 Å; this trend is consistent with the observation that greater values calculated according to Formula (1) correlate with greater Plug Crush Recoveries. It also may be speculated that the more gradual increase or plateau in Plug Crush Recovery at Apparent average Microfibril Diameters above about 275–300 Å results from competing or Alternative mechanisms or influences, one possibility being diminished interconnectivity between microfibrils as they increase in size.

While the foregoing discussion uses an interpretation of oriented polymer fiber models to provide perspective for findings related to the present invention, it is to be understood that the invention is not limited to or by theory, whether in the form of any particular model or interpretation thereof, the foregoing explanation based thereon, or otherwise.

Referring again to FIG. 3, it can be seen that calculated values according to Formula (1) of at least about 240 Å, which characterize the invented fibers, correspond to yarn Plug Crush Recoveries of at least about 85%. Such Plug Crush Recoveries exceed those of known propylene polymer yarns and approach or equal those of nylon yarns. Thus, known commercial propylene polymer carpet face yarns exhibit Plug Crush Recoveries below 80%, and typically about 60–75%. In contrast, the invented yarns exhibit Plug Crush Recoveries surpassing known propylene polymer yarns and approaching or even equaling Plug Crush Recoveries of nylon yarns (85–95%).

Detailed procedures for measuring Plug Crush Recovery are described in connection with the examples appearing below. The test is a compressional recovery test for BCF yarns, with or without twisting and heatsetting, that involves compressing a one inch high yarn plug in a cylindrical form for a period of time under a prescribed load, allowing the plug to recover for a period of time and then measuring its height. Plug Crush Recovery is expressed in percent and is calculated by multiplying 100% by the quotient of height of the plug after compression and recovery divided by initial height. The Plug Crush Recovery Test is accurate to about 5%.

While compression testing of yarns correlates only loosely with thickness retention or pile height recovery of carpets, as discussed above, testing by the Plug Crush Recovery test has shown it to be useful for predicting carpet performance of BCF yarns. In fact, in the case of carpets tufted with propylene polymer BCF yarns, the Plug Crush Recovery test has been found to correlate better with carpet walkout testing than traditional accelerated wear tests such as Simfloor and tetrapod testing. Those tests were developed for accelerated wear testing of nylon-tufted carpets and have been perceived to correlate at least qualitatively with walk-out testing of those carpets. While the tests are often used for propylene polymer yarn-tufted carpets, they do not take into account that actual walkout testing of propylene polymer yarn-tufted carpets has shown the same to be sensitive to the rate of wear. Faster wear rates result in flatter, more matted carpets, while carpets wear better when tested at rates more closely approximating wear in actual use. As a result, the accelerated wear from those traditional nylon carpet test methods produces greater matting and clumping of propylene polymer face yarns than that observed in actual walkout testing.

Figure 4:
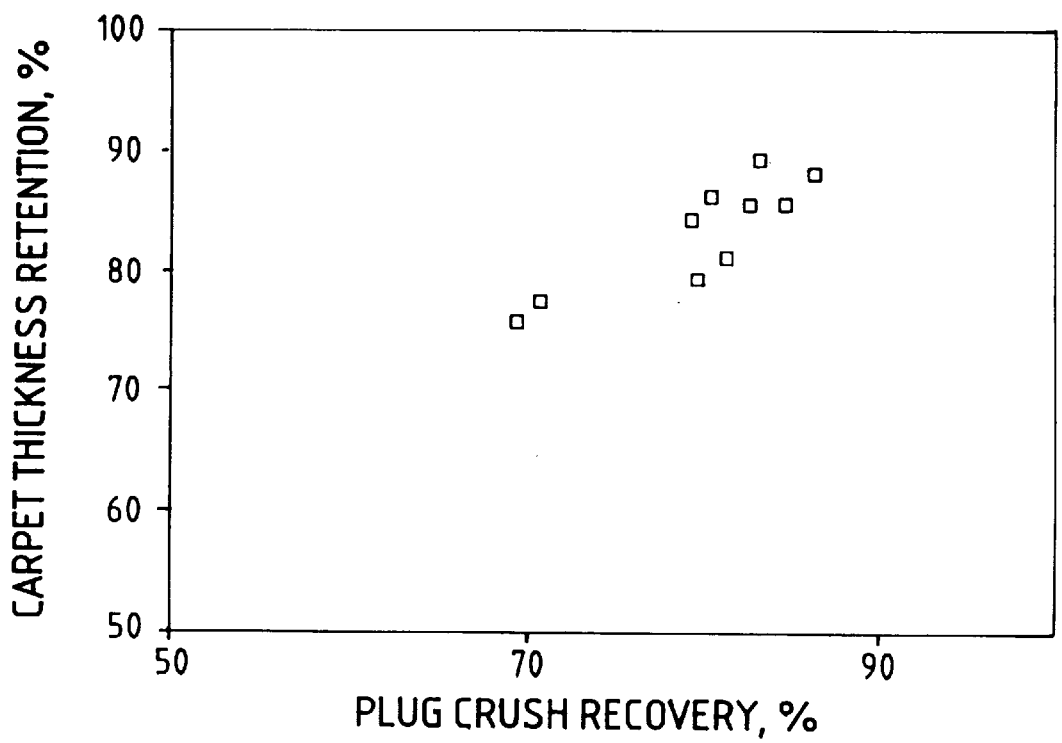
FIG. 4, a plot of carpet thickness recoveries against Plug Crush Recoveries of samples of the yarns with which the carpets were tufted.

FIG. 4 is a plot of thickness retentions of carpets tufted with propylene polymer BCF yarns against Plug Crush Recoveries of the yarns. Carpet thickness retentions were obtained for cut pile carpets tufted with two-ply, 1450 denier, 144 filament polypropylene bulked, continuous multifilament yarn having 4.5 twists per inch. Initial pile height was one-half inch and thickness retention, expressed in percent of initial total carpet thickness, was determined by crushing carpet samples with a force of 2500 psi for two and one-half minutes and measuring sample thickness after recovery for 24 hours. As seen from FIG. 4, Plug Crush Recoveries of at least 85% generally correspond to carpet thickness retentions of at least about 85% for the carpets that were tested. In addition to improved thickness retention in carpets, yarns composed of the invented fibers show improved carpet performance in carpet walkout tests. In controlled walkout tests conducted by subjecting carpets to repeated foot traffics and then having the carpets rated on a scale of 1 (worst) to 5 (best) in various respects, the results shown in Table I were attained. Unless otherwise indicated in the table, carpets were tufted with BCF yarns.

TABLE I

| Face Yarn | Conventional Polypropylene | This Invention | Nylon Staple | Nylon |
|---|---|---|---|---|
| A. Walkout Testing of 40 Ounces/Square Yard Carpet, ½Inch Pile Height after 100,000 Traffics | | | | |
| Overall | 2.5 | 3.3 | 2.2 | 3.0 |
| Tip Definition | 3.5 | 3.8 | 2.8 | 3.8 |
| Twist Retention | 4.0 | 4.5 | 3.2 | 4.5 |
| Hand | 3.3 | 3.5 | 3.8 | 4.0 |
| Plug Crush Recovery(%) | 77.6 | 86.4 | 87.9 | 89.3 |
| B. Walkout Testing of 30 Ounces/Square Yard Carpet, ¼Inch Pile Height, after 50,000 Traffics | | | | |
| Overall | 3.4 | 3.5 | 4.2 | — |
| Tip Definition | 3.1 | 3.7 | 4.1 | — |
| Twist Retention | 3.5 | 4.1 | 4.5 | — |
| Hand | 3.5 | 3.4 | 4.4 | — |
| Plug Crush Recovery(%) | 78.1 | 86.8 | 88.5 | — |

Results for the nylon staple-tufted carpet in Table IA are representative for the testing that was performed; the better results for the nylon staple-tufted carpet in Table 1B also are consistent with other observations in walkout tests that such nylon-tufted carpets tend to perform well to a point but then decline dramatically between 50,000 and 100,000 traffics. From the other results in Tables IA and B, however, it can be seen that yarns composed of the invented fibers and tufted into carpets showed improved carpet performance as compared to conventional propylene polymer carpet yarns in terms of overall appearance, tip definition, and twist retention. It also can be seen that the invented yarns were either comparable to or approached the nylon yarns in carpet performance. Similar results are also seen from Table II below in which testing results after 50,000 traffics are shown for ¼ inch pile height carpets ranging from 25 to 32 ounces/square yard.

TABLE II

Comparative Carpet Walkout Test Results

| Sample | Fiber Type | Plug Crush Recovery(%) | Tip Definition | Twist Retention |
|---|---|---|---|---|
| 1 | Conventional Polypropylene | 76.7 | 2.6 | 3.1 |
|  | This Invention | 84.4 | 3.8 | 4.0 |
|  | Nylon Staple | 84.4 | 4.3 | 4.3 |
| 2 | Conventional Polypropylene | 76.9 | 3.6 | 4.0 |
|  | This Invention | 86.8 | 4.0 | 4.3 |
|  | Nylon Staple | 88.5 | 4.5 | 4.5 |
| 3 | Conventional Polypropylene | 78.4 | 3.6 | 4.1 |
|  | This Invention | 85.0 | 4.0 | 4.1 |
|  | Nylon Staple | 82.5 | 4.3 | 4.4 |
| 4 | Conventional Polypropylene | 78.1 | 3.1 | 3.5 |
|  | This Invention | 86.8 | 3.7 | 4.1 |
|  | Nylon Staple | 88.5 | 4.1 | 4.5 |
| 5 | Conventional Polypropylene | 79.9 | 3.6 | 3.8 |
|  | This Invention | 84.9 | 3.8 | 4.2 |
|  | Nylon Staple | 88.7 | 4.0 | 4.1 |

It is readily apparent from FIG. 4 and Tables I and II that performance of carpets tuffed with the invented yarns is far superior to conventional polypropylene yarns and compares favorably with nylon yarns.

As described previously, the invented fibers comprise crystalline propylene polymer and are characterized by the small angle X-ray diffraction technique utilized herein, with the fibers positioned at angles of 0°, 10° and 20° between their longitudinal axes and a perpendicular to the X-ray beam, such that the average calculated by Formula (1) above is at least about 240 Å.

The propylene polymer of which the invented fibers are comprised is a resinous, crystalline polymer comprising recurring, polymerized propylene units. Crystallinity of the propylene polymer, as present in the fibers, preferably is at least about 30%, as determined by wide angle X-ray diffraction. More preferably, crystallinity is about 35 to about 55% and especially about 40 to about 50%.

Homopolymer polypropylene is a preferred propylene polymer although copolymers with other monomers as well as blends of propylene homopolymer and/or copolymer with other polymers also are contemplated provided that the composition and proportion of polymerized comonomer units and/or blended polymer or polymers are such as not to alter the basic and essential nature and characteristics of the invented fibers. For purposes hereof, unless context dictates otherwise, the term "copolymer" is used in its broad sense to mean interpolymers having two or more types of repeat units. Examples of copolymers of which the invented fibers may be comprised include propylene-dominated copolymers of propylene with one or more of ethylene and higher olefins such as butene-1, butadiene, 4-methyl pentene-1, hexene-1, octene-1 and t-butylstyrene. Examples of suitable polymers and copolymers for blending with propylene polymer include high, low and linear low density polyethylenes, ethylene-propylene copolymers, poly t-butylstyrene, polyvinylmethyl ether, polyamides, such as nylon 6, nylon 66 and polyphthalamides, and polyesters, such as polyethylene terephthalate, polybutylene terephthalate and polyethylene naphthalate. Compatibilizing agents may be useful to improve compatibility between polar resins, such as polyamides and polyesters, with the propylene polymer; examples include maleated polypropylenes and other functional group-containing polymers and copolymers containing polymerized olefin units. Amounts of copolymerized monomer units present in the propylene polymer, or of other polymers present in blends with the propylene polymer, will vary depending on the choice of comonomer(s) or other polymer(s) and the effect to be imparted by same. Preferably, however, no more than about ten parts of such polymerized comonomer units or other polymer per hundred parts by weight polymerized propylene units or propylene polymer are present; greater amounts may adversely affect other desirable properties of the invented fibers such as strength and stain resistance.

The invented fibers also can comprise various additives and modifiers. A wide variety of such materials is well known to the art; examples include pigments, finishes and other process aids, flame retardants, heat and light stabilizers, antimicrobial agents, electrically conductive materials, antistatic agents and stain resisting agents. Such additives and modifiers can be incorporated into the propylene polymer composition from which the invented fibers are produced or they can be applied to the fibers after preparation thereof or after conversion of fibers or yarns into textile or other products, again as known in the relevant arts. Amounts of such additives and modifiers vary with the material and the purpose for which they are used. When the same are incorporated into the resin from which the invented fibers are made, they should not be used in amounts that interfere with fiber manufacture or attainment of the novel crystalline microstructure of the invented fibers. Amounts of additives typically used for practical applications of conventional propylene polymer fibers have been found not to interfere with attainment of such microstructure and those skilled in the synthetic fibers and yarn art will appreciate that optimum amounts and limits on amounts of particular additives for particular purposes will be ascertainable without undue experimentation.

The unique and novel crystalline morphology of the invented fibers is defined by the relationship expressed in Formula (1) above. Derivation of the formula is explained in M. A. Gezalov et al., *J. Polym. Sci.* USSR, A12, 2027 (1970) (translated from Vysokomol. soyed, A12, 1787 (1970)), which is incorporated herein by reference and discussed below. Oriented fibers of crystalline propylene polymer have so-called long periods, composed of more-or-less regularly alternating regions of more ordered, denser, crystalline polymer and less ordered, less dense, amorphous polymer. Periodicity of electron density along the fiber axis resulting from these crystalline and amorphous regions produces small angle X-ray meridional reflections from which aspects of fiber morphology can be analyzed. According to Gezalov et al., changes in intensity of small angle X-ray reflections of fiber samples positioned at different angles of inclination relative to the X-ray beam can be utilized to determine average transverse dimensions of crystalline regions of microfibrils according to Formula (1) or, in the terminology utilized hereinabove, Apparent Average Microfibril Diameters.

In carrying out the X-ray diffraction used for determination of Apparent Average Microfibril Diameters according to this invention, it is important that the X-ray beam be narrow to measure the small angle X-ray diffraction at 2 Ø angles starting at at least about 4–5 angular minutes from the center of the beam. To this end, a relatively narrow cathode filament is used and the X-ray beam is slit collimated. For purposes of the X-ray diffraction utilized according to this invention, the beam is collimated such that angular width of the incident X-ray beam, measured at half-height of its maximum intensity, is 1.81 angular minutes. It also is desirable that background scattering from the edges of the collimation slit be minimized. This can be accomplished through the use of a so-called knife or adjustable slit positioned between the collimating slit and the sample being analyzed. A copper anode is conveniently used to generate the X-ray beam. CuKα radiation, having a wavelength of 1.5418 Å, is used. When using an anode that generates radiation of a different wavelength, the term 1.5418 Å in the equation for L in Formula (2) is replaced with wavelength, in Angstroms, of the X-ray radiation. Detailed procedures for conducting the small angle X-ray diffraction method utilized according to this invention are described in connection with the examples appearing hereinbelow.

In Formula (1), $I_m(0)$ and $I_m(\alpha)$ refer to maximum intensity of small angle X-ray meridional reflections, after separating reflections from diffuse scattering and application of the Lorentz correction, with the fiber positioned such that its longitudinal axis is inclined at angles of 0° and $\alpha$, respectively, to a perpendicular to the X-ray beam. Small angle X-ray diffraction patterns usually consist of two parts: a peak produced by the more or less regular periodicity of electron density, e.g., long periods, and diffuse scattering. Diffuse scattering includes scattering from the air, from the collimating slit of the diffraction system and from the sample, e.g., submicrocracks randomly disposed throughout the fiber. In the X-ray diffraction patterns, diffuse scattering appears as a smooth curve of decreasing intensity with increasing diffraction angle. For determining maximum intensity of the peak, diffuse scattering is separated or backed out so that peak height is determined without contribution from diffuse scattering. Separation of the diffuse scattering is accomplished by extrapolation through the area under the peak of the smooth curve from the diffuse scattering. Maximum intensity of the peak is determined from the height of the peak over this extrapolated diffuse scattering line. It will be appreciated that the extrapolation can introduce some level of uncertainty into the determination of maximum intensity; however, when the intensity of the diffuse scattering is small relative to the intensity of the peak at the angles of maximum intensity of the peak, as is the case in the present invention, the uncertainty is small.

Maximum intensities of meriodional reflections are corrected by application of the Lorentz factor to account for divergence of the incident X-ray beam. The Lorentz factor is well known to those skilled in the art of X-ray crystallography and is described in detail in L. E. Alexander, *X-Ray Diffraction Methods in Polymer Science,* Robert E. Krieger Publishing Company, Malabar, FL, pp. 40–41, and H. P. Klug and L. E. Alexander, *X-Ray Diffraction Procedures,* John Wiley & Sons, New York, N.Y. (1974) p. 143, which are incorporated herein by reference. For purposes hereof, the factor equals the reciprocal of the product of the sin of double the diffraction angle, Ø, multiplied by the sin of the diffraction angle, i.e., $1/(\sin 2\emptyset \sin \emptyset)$. The factor is applied by multiplication by the uncorrected maximum intensity of meridional reflections obtained by small angle X-ray diffraction of the fibers at the angles (0° and $\alpha$) utilized for the Formula (1) calculation.

For purposes of the invention, angles, $\alpha$, of 10° and 20° are used for the calculation of Apparent Average Microfibril Diameter because they are convenient and produce sufficient changes in intensity maxima ($I_m(\alpha)$) for use in the calculation according to Formula (1).

The term L in Formula (1) represents long period, in angstroms, of the fiber. As explained in Gezalov et al., this value is determined by dividing wavelength of the X-ray radiation—1.5418 Å in the case of CuKα radiation—by the angle, in radians, of the center of the small angle X-ray reflection relative to the center of the incident X-ray beam with the fiber positioned with its longitudinal axis perpendicular to the incident X-ray beam. For purposes hereof, the center of the small angle X-ray reflection is to be understood to refer to the midpoint of the full width of the reflection at its half-height. Long periods of the invented fibers in the range of about 190 to about 240 Å have been observed. Dispersion of the long periods, that is, standard deviations of long periods divided by mean long periods, have been observed in the range of about 0.16 to about 0.2. For fibers composed of certain propylene polymer resins, some correlation between dispersion of long periods and Plug Crush Recovery may exist with respect to the invented fibers; however, observations of fibers according to the invention composed of other resins do not suggest broad applicability of any such correlation.

While other methods for estimating transverse dimensions of microfibril crystals exist, results according to Gezalov et al. are reported by the authors to show reasonable conformity to results according to such other methods. The method according to Gezalov et al. is used in the present invention owing to its acceptance by subsequent investigators, as reported in I. P. Dobrovol'skaya et al., *Vysokomol. soyed.*, A23: No. 6, 1261–1267 (1981); L. I. Slutsker et al., *J Pol. Sci.: Polymer Symposium*, 58, 339–358 (1977); Prevorsek et al., *J. Matl. Sci.* 12, 2310–2328 (1977); I. P. Dobrovol'skaya, *Vysokomol. soyed.* A17: Na7, 1555–1559 (1975); Prevorsek (1973) supra. Furthermore, it is based on measurements obtainable with equipment more readily available than that required for other known methods.

For the invented fibers, small angle X-ray diffraction measurements by the method utilized herein yield calculated values according to Formula (1) of at least about 240 Å. Such values correlate with improved resilience of the fibers and yarns composed of the fibers and have not been observed in previously known propylene polymer yarns. Indeed, known commercial carpet yarns composed of propylene polymer fiber, when analyzed by the small angle X-ray diffraction method utilized herein, exhibit calculated values according to Formula (1) no greater than about 200 Å. Calculated values for the aforementioned Genesis™ Carpet program yarns have been observed in the range of about 135 to about 145 Å. Thus, the invented fibers possess a novel crystalline morphology not previously reported in the known prior art nor seen in known propylene polymer fibers and yarns. Preferred fibers according to the invention exhibit small angle X-ray diffraction profiles such that the value obtained according to Formula (1) is at least about 250 Å, and more preferably at least about 275 Å, to enhance resilience of the fibers and yarns comprising the same. As seen from FIG. 3, at Apparent Average Microfibril Diameters of about 275 Å and greater, Plug Crush Recoveries approaching and even exceeding 90% have been attained. Also as seen from FIG. 3, Plug Crush Recovery tends to plateau at about 90% with Apparent Average Microfibril Diameters of about 275 to about 400 Å. While there may be little practical reason to exceed Apparent Average Microfibril Diameters of about 275 to about 350 Å in terms of Plug Crush Recovery improvements of yarns, values in the range of 450–500 Å have been observed. These and even greater values are contemplated according to the invention and may provide a combination of excellent resilience and other useful and interesting properties and benefits.

Total crystallinity of the invented fibers, determined by wide angle X-ray diffraction, is generally at least about 30% and, preferably, about 35 to about 55%, with about 40 to about 45% giving best results. Fibril crystallinity, defined as the portion of long periods occupied by crystallites and determined by wide and small angle X-ray diffraction, is preferably about 55 to about 65%. Transverse crystallinity, defined as the portion of fiber cross-section occupied by microfibrils and determined from total and fibril crystallinities, preferably ranges from about 60 to about 80%.

The invented fibers can be provided in any desired form and with a wide range of physical properties. Examples of the former include continuous monofilament fiber, staple fiber of any desired length, continuous multifilament yarns with or without bulk and/or twist, spun yarns obtained by spinning staple fibers, and tow comprising a plurality of yarns comprising the invented fibers in the form of continuous filaments or staple fiber. Filament cross sections of any desired shape are suitable, examples including round, delta, tri- and quadrilobal and dumbbell shaped cross-sections. Fiber properties well suited to a wide range of textile products include linear densities (deniers) of about 0.5 to about 60 grams per 9000 meters, tensile strengths of about 1 to about 10 grams per denier, elongations of about 2 to about 400%, shrinkages in hot water of about 1 to about 10% and in hot air of about 1 to about 15%, recoveries from deformation of about 70 to about 98% and tactile properties or "hand" appropriate for intended end uses. Yarns comprising such fibers, alone or in combination with other fibers, having properties such as linear densities in the range of about 20 to about 10,000 grams per 9000 meters, tensile strengths of about 1.5 to about 10 grams per denier, elongations of about 2 to about 200%, shrinkages in hot water of about 1 to about 15% and in hot air of about 1 to about 15%, recoveries from deformation of about 70 to about 98% and acceptable hand are also suitable for various textile applications. Deniers exceeding 10,000 are easily achieved by combining multiple yarns. Properties outside these ranges in one or more respects also can be beneficial for particular end uses, as will be appreciated by persons ordinarily skilled in the relevant art(s). The fibers and yarns in any desired form also can be subjected to various additional processing steps, such as carding, drafting, open end spinning, ring spinning, airjet spinning, weaving, warp and weft knitting, needlepunching, heat bonding, tufting, crimping, texturizing and twisting, as known in the art. Advantageously, the novel crystalline microstructure of the fibers is retained after such processing steps provided that the same do not entail exposure for a significant period of time to temperatures within about 5° C. of the melting point of the propylene polymer of which the fibers are comprised.

In a preferred embodiment of this aspect of the invention, the invented fibers are provided in the form of yarns, including both spun yarns and continuous filament yarns. Such yarns have utility in a wide range of applications, including face yarns for carpets, apparel yarns and fabrics, upholstery fabrics, automotive fabrics, industrial fabrics, geotextile fabrics, and technical fabrics. The yarns can be configured in any manner to meet desired end-use requirements.

Spun yarns comprising the invented fibers in the form of staple fibers of any suitable length can be prepared by any suitable technique. Lengths of about one to about ten inches are typical of known commercial end uses for these types of fibers although longer or shorter fibers are also contemplated. Staple fiber typically is prepared by tower and compact spinning processes; these involve extruding molten resin through orifices in a spinnerette to form a tow of filaments, drawing the filaments, for example with one or more roll stands, and cutting the drawn filaments to desired lengths. Optionally, crimping or other texturing is conducted prior to cutting. Any suitable technique for spinning staple fibers into spun yarn can be utilized. Examples include open end spinning, ring spinning, airjet spinning, core spinning, and wrap spinning. Properties of spun yarns well suited to a broad range of end uses include linear densities of about 100 to about 10,000 denier, tensile strengths of about 0.5 to about 8 g/denier, elongations to break of about 5 to about 200%, twist of about 0.5 to about 30 turns per inch, shrinkages of about 1 to about 15%, hairiness of about 5 to about 100 hairs/meter and bulkiness, in terms of extensibility by removal of bulk, of about 2 to about 20%. Of course, persons ordinarily skilled in the art will appreciate that properties outside these ranges also may be advantageous for some end-uses. More specific properties for particular end uses are known to those skilled in the art or arts to which such end uses are related.

Continuous multifilament yarns comprising the invented fibers are made up of a plurality of continuous filaments including those according to the invention. The number of filaments per yarn can vary widely depending on end use requirements. Such yarns can be prepared from the invented fibers by any suitable means. In one embodiment, described in greater detail below, the yarns are prepared by a process comprising the steps of melt spinning crystalline propylene polymer resin composition to form filaments, gathering the filaments to form yarn, drawing the filaments or yarn, texturizing the yarn and heatsetting the textured yarn, with conditions in each step being selected so as to develop in individual filaments over the course of the process the crystalline morphology described above. Preferred yarn properties for particular end uses will vary depending on requirements therefor, as known to those skilled in the arts related to such end uses. Generally, linear densities of about 100 to about 3,000, tensile strengths of about 1.5 to about 10 g/denier, elongations to break of about 5 to about 200%, and shrinkages of about 1 to about 15% are well suited for yarns for industrial applications, while linear densities of about 20 to about 5,000 tenacities of about 1.5 to about 6 g/denier, bulkiness of about 2 to about 20% extensions of about 5 to about 200%, recoveries from extension of about 70 to about 98%, shrinkages of about 1 to about 15% and good hand are well suited for textured yarns for other end uses. Again, persons ordinarily skilled in the art will appreciate that greater or lesser values in one or more of these respects can be beneficial for particular end uses.

In a particularly preferred embodiment of this aspect of the invention, the invented fibers are provided in the form of BCF yarns having Plug Crush Recoveries of at least 80% and, more preferably, at least about 85%. Bulk levels of such yarns preferably range from about 2 to about 20%. Such yarns possess an advantageous combination of mold and mildew resistance, colorfastness when pigmented, stain resistance, strength, water absorption resistance, compressional recovery and good coverage, texture and hand and are well suited for use as commercial and residential carpet face yarns, as face yarns for automotive carpets, trunk liners and kick panels and as pile yarns for upholstery fabrics. BCF yarns having Plug Crush Recoveries of at least 85% surpass known propylene polymer BCF carpet yarns in resilience as measured by the Plug Crush Recovery test. Accordingly, the present invention also provides novel BCF yarns comprising a plurality of continuous filaments comprising propylene polymer, wherein the yarns have Plug Crush Recoveries of at least 85%. Such yarns are particularly well suited for use as residential and commercial carpet yarns.

BCF yarns comprising the invented fibers can be provided in any desired configuration provided that their bulk level is about 2 to about 20%. Bulking traditionally has been practiced in the manufacture of BCF yarns to provide texture to synthetic yarns by introducing looping, waviness, entanglement, whirls, kinkiness, curliness or other deformations into filaments making up yarns. In the present invention, bulking serves that purpose and also contributes to resilience of the yarns as measured by the Plug Crush Recovery test. Plug Crush Recovery generally increases with increasing bulk up to about 10%, and then tends to decline as bulk increases above 10%. While optimum bulkiness of the invented yarns in terms of Plug Crush Recovery is about 10%, Plug Crush Recoveries of at least 85% generally are achieved at bulk levels ranging from about 2 to about 20% and preferably at about 5 to about 15%. Preferably, bulk levels range from about 2% to about 10% for yarns that are used for insulation and coverage, such as in window channels, and from about 8% to about 20% for yarns that are used for coverage and aesthetics, such as in carpets and upholstery.

Bulkiness of the invented yarns can take any suitable form. Examples include the random entanglement, waviness, looping and whirling of filaments and fluffiness of yarns imparted by texturing with fluid jets or with twisting and detwisting spindles, and the curling, crimping, kinking and/or sawtooth configuration resulting from crimping in stuffer boxes or passing yarns over an edge. A preferred form of bulkiness, for both its contribution to improved resilience as measured by Plug Crush Recovery and the desirable appearance and coverage it imparts, is that produced by texturizing with fluid jets. Generally, such textured yarns have a high degree of bulkiness, coverage, uniformity of bulk, and, in yarns comprising differently colored filaments, good intermixing of colors. Bulk levels of such yarns preferably range from about 8% to about 16%, with about 8% to about 12% being preferred from the standpoint of maximizing Plug Crush Recoveries.

The yarns, according to this aspect of the invention are multifilament yarns and, accordingly, are composed of a plurality of individual filaments. The number of filaments per yarn is at least two and not subject to an upper limit. The number normally is selected based on end-use requirements, as known in the art, and can vary widely. Yarns having anywhere from about 5 to about 2400 filaments are easily prepared and suited to a variety of end uses. For carpet yarns, about 40 to about 300 filaments per yarn are preferred because the yarns exhibit good Plug Crush Recoveries, are well suited for tufting operations and provide good appearance and performance in carpets.

Individual filaments of the yarns according to this embodiment of the invention can have any desired diameter, denier and cross-section. Fibers with diameters of about 9 to about 115 microns are conveniently prepared and well suited to a wide range of applications; however, larger and smaller diameters are contemplated and beneficial in some applications. Fiber deniers generally range from about one-half to about 100 grams per 9000 meters although greater and lesser deniers also are suitable for various end uses. Round, trilobal, quadrilobal, delta, rectangular and hollow are examples of suitable cross-sections. For carpet face yarn, preferred fiber characteristics include diameters of about 30 to about 65 microns and deniers of about 8 to about 30 grams per 9000 meters. Filament counts of such yarns preferably are about 70 to about 300 filaments per yarn, with yarn bundle deniers of about 500 to about 3000 grams per 9000 meters being preferred. Trilobal, delta and other fiber cross sections that tend to provide light-reflecting or soil-hiding characteristics to yarns are preferred.

The BCF yarns preferably are composed entirely of the invented fibers although blends with other fibers also are contemplated. Examples of such other fibers include conventional polypropylene, polyethylene, nylon, polyester, acrylic, rayon, acetate and cotton fibers. In composite or blended yarns comprising the invented fibers and other types of fibers, the proportion of the invented fibers can vary widely depending on the choice of other such fibers, yarn type and desired overall yarn properties. Thus, as little as one weight % or as much as 99 weight % of such other fibers and a balance of the invented fibers can be present to provide yarns having beneficial and interesting combinations of properties. For example, in blends with nylon fibers, from about 25 to about 75 weight % of the invented fibers can be used to obtain yarns of high resilience at lower cost than yarns composed solely of nylon fibers. As the proportion of the invented fibers increases, other beneficial features of propylene polymer fibers and yarns, such as colorfastness, cleanability and stain, mold and mildew resistance, become more pronounced in the yarns and products comprising same.

Preferred yarns according to this embodiment of the invention are BCF yarns comprising propylene polymer fibers with respect to which the value calculated according to Formula (1) is at least about 250 Å and, more preferably, at least about 275 Å, to maximize resilience. These yarns preferably have Plug Crush Recoveries of at least 85%. More preferably, Plug Crush Recovery is at least about 87%, and most preferably at least about 90%, to maximize resilience of the yarns and resistance to and recovery from compression, wrinkling, creasing, crushing and bending in textile products comprising such yarns. Such yarns also have good hand and surface characteristics.

The invented fibers and yarns are useful in various textile products. Examples include tufted carpets for residential applications, tufted carpets for commercial applications, upholstery fabrics, geotextile fabrics, automotive carpets and fabrics, highloft nonwovens, apparel fabrics and industrial fabrics.

Tufted carpets comprising the invented fibers or yarns exhibit improved pile height retention, appearance and wear relative to tufted carpets comprising conventional propylene polymer fiber or yarns, other things being equal. Alternatively, the improved resilience of the invented fibers and yarns can be used to achieve materials savings, for example by reducing tuft density in carpet constructions or by allowing tufting with combinations of the invented yarns with other yarns of greater or lower resilience and cost, while still achieving performance at least comparable to that of conventional carpets. As discussed above, carpets tufted with the invented yarns compare favorably with carpets tufted with nylon yarns in terms of pile height retention, overall appearance, twist retention, tip definition and hand.

Carpets comprising the invented fibers or yarns comprise a backing structure, also referred to as a primary backing, such as a fabric, film or sheet, penetrated by a plurality of face yarn tufts such that the tufts project outwardly from one surface of the backing to form a pile surface and tuft stitches are disposed on an opposing surface of the backing. Carpets can be prepared by any suitable means. Generally, the primary backing is advanced through a tufting device equipped with a plurality of reciprocating tufting needles. Face yarn is stitched into the backing by the reciprocating action of the needles. Yarn tufts can be cut to provide a cut pile surface or can remain uncut to provide a looped pile surface. Secondary backing structures, such as a woven fabric, scrim or netlike web, often are also used to impart additional dimensional stability to the carpets, the same being affixed to the stitched surface of the primary backing with latex, hot melt or other adhesives or by thermal or other bonding to other elements of the carpet structure. Tufted carpets can be provided in a broad range of styles and weights. Examples of the former include Saxony, Berber, velvet, cut-and-loop, cut pile, high-low, and loop pile carpets. Weights typically range from about 14 to about 35 ounces per square yard for commercial carpets and about 22 to about 65 ounces per square yard for residential carpets. Pile heights of about $3/8$ to about $7/8$ inch are typical in residential carpets while about $3/16$ to about $1/2$ inch are typical of commercial carpets. Tuft densities typically range from about 2000 to about 6500 ounces per cubic yard for both types of carpets. While these constructions are typical of the types of carpets currently used in various applications, it will be appreciated by those skilled in the art that heavier and lighter weights, longer or shorter pile heights and greater or lesser tuft densities also can be suitable for various end uses and are contemplated for use of the invented fibers and yarns.

Preferred yarns for carpet face yarn for residential and commercial carpets have Plug Crush Recoveries of at least 85%, and more preferably at least about 87%, and linear densities of about 1200 to about 3000 grams per 9000 meters, with about 70 to about 300 filaments per yarn and about 8 to about 30 denier per filament. Other characteristics of such yarns include tensile strengths of about 3 to about 6 grams per denier, elongations of about 10 to about 75%, shrinkage in hot water of about 2 to about 8%, shrinkage in hot air of about 2 to about 12% and acceptable hand.

Beyond the well known advantages of even conventional propylene polymer face yarns over nylon yarns in carpets, including colorfastness, stain, mold and mildew resistance, improved cleanability and reduced water absorption, the invented yarns, by promoting expanded usage of propylene polymer face yarns due to their improved resilience, also provide an opportunity for greater recycling in carpet manufacture than do nylon, polyester or natural fiber yarns. Thus, while polypropylene woven fabric is the most commonly used backing material for carpets, polypropylene and face yarns of those other compositions are incompatible in melt processing operations because they form multi-phase systems that may be difficult to process and/or yield products with inferior properties. Propylene polymer face yarn from the invented carpets, on the other hand, is readily melt processible with polypropylene from backings and, therefore, scrap and waste resulting from carpet manufacture is well suited for recycle.

Upholstery fabrics comprising the invented fibers or yarns also offer advantages over those with conventional propylene polymer fiber or yarns in terms of wear, crush resistance and recovery and resistance to creasing and wrinkling. In this application, like carpets, the stain resistance, cleanability and colorfastness properties of the invented yarns also are beneficial. Examples of specific upholstery fabrics include seat and pillow covers and drapery fabrics. Upholstery fabrics typically are manufactured using weaving, knitting, and nonwoven fabrication processes and can be provided in a wide range of styles. Examples of upholstery weaves include brocade, damask, brocatelle, jaspe, monk's cloth, upholstery satin, velvet and velour. The fabrics often are coated with latex and form-fitted to furniture. Typical properties of yarns used in this application include linear densities of about 75 to about 2000 grams per 9000 meters, tensile strengths of about 3 to about 6 grams per denier, elongations of about 10 to about 30%, and recoveries from extension of about 80 to about 98%. Specific yarn properties for particular end uses are well known to those skilled in the upholstery art.

Geotextile fabrics also benefit from the improved properties of the invented fibers and yarns. Examples of geotextile fabric applications include stabilization of automobile road beds and railroad beds, silt fences, erosion control fabrics, pond liners, waste dump liners, and dike reinforcement fabrics. Such fabrics are typically made by nonwoven manufacturing processes from the invented fibers and yarns in the form of staple fibers. For example, fibers can be carded and laid as a form, a web or a batt and these can be drafted to stretch the same, cross-lapped with one or more other batts to provide additional strength if desired and needled or otherwise processed to entangle the fibers and thereby provide uniformity and integrity to the web. Fabrics woven from spun yarns and continuous multifilament yarns are also utilized. Most applications require yarns with good tensile strength, elongation, recovery from elongation, resilience, puncture resistance, controlled porosity, and water resistance. Yarns having tensile strengths of about 4 to about 8 grams per denier, elongations from about 10 to about 30% and recoveries from elongation of about 70 to about 98% are well suited to a wide range of geotextile end uses although persons skilled in the art will appreciate that greater or lesser values may be appropriate for particular end uses and are contemplated according to this aspect of the invention.

Automotive carpets and fabrics comprising the invented fibers and yarns also offer advantages over conventional materials. Such fabrics can be produced by weaving, tufting and non-woven manufacturing processes. In the case of automotive carpets and trunk liners, improved resilience contributes to longer retention of appearance and better wear. In the case of kick panels, improved resilience promotes recovery from indentations and scuffing. Upholstery fabrics for automobile seat covers also show better recovery from wrinkling and pile crush. Typical properties of yarns for these automotive fabrics include tensile strength of about 2 to about 6 grams per denier, shrinkage of about 0.5 to about 3%, elasticity of about 85 to about 98% and recovery from compression of about 70 to about 95%, although greater or lesser values may be advantageous for particular applications and are within the scope of this aspect of the invention.

Highloft nonwovens are used in applications such as padding, fiberfill, filtration and insulation and can benefit from the resilience attributable to the invented fibers and yarns. These products typically are made by forming fibers into batts by needling or other techniques that impart appropriate fiber-to-fiber cohesion for strength and bulk density for permeability. Fibers for such applications should have sufficient tenacity, elongation and modulus for mechanical integrity, controlled shrinkage and recovery from compression and compaction.

Apparel fabrics comprising the invented fibers and yarns show improved resistance to wrinkling and creasing as well as improved retention of thickness and bulk. In fabrics and yarns for cold weather apparel, the latter can contribute to improved thermal insulation properties because the increased resilience of the individual fibers and yarn bundles enhances retention of insulating air space among the fibers and yarn bundles. Apparel fabrics can be prepared by weaving and knitting as well as by nonwoven fabric manufacturing techniques. Typical properties of yarns for durable apparel fabrics include deniers of about 1.5 to about 6 grams per 9000 meters, tenacities of about 2 to about 6 grams/denier, elongations of about 10 to about 40%, shrinkage of about 0.5 to about 3% and bulk densities appropriate for apparel applications, generally ranging from about 0.5 to about 3 cm$^3$/gram. Woven and knit fabrics comprising the invented yarns and other natural or synthetic yarns also are contemplated.

The invented fibers also can be provided in the form of disposable apparel fabrics. Fabrics for disposable apparel typically are low cost nonwoven products such as those prepared by spunbonded manufacturing processes, in which a plurality of filaments of molten synthetic resin are extruded, cooled, deposited on a moving surface and then bonded by application of heat and pressure or adhesives to form a web or mat, meltblowing processes, in which fibers are spun into a stream of high velocity air or other fluid, which attenuates the same into relatively fine fibers, and then deposited on a collection device, and centrifugal spinning processes, in which fibers are spun in a circular orbit and fuse and entangle to form a tubular web which can be slit and opened to form a final fabric or further bonded by application of heat or adhesives. Composites of these types of fabrics with each other or other materials also find use as disposable apparel fabrics. Typical properties of fibers of such fabrics include deniers of about 0.5 to about 8 g/9000 meters, tenacities of about 1.5 to about 5 g/denier, elongations of about 5 to about 300% and recoveries from compression of about 75 to about 95%. Again, persons skilled in the art will appreciate that for particular apparel applications, greater or lesser values for one or more of these properties may be necessary or desirable and are contemplated according to the invention.

In another aspect, the present invention also provides a method for producing improved textile products, including fibers and yarns, comprising as an essential step heating a textile product comprising propylene polymer fibers at at least one temperature below but within about 20° C. of the melting point of the propylene polymer, with such fibers in a substantially relaxed state. In one embodiment, such heat treating step is applied to textile products in which the propylene polymer fibers exhibit a particular crystalline morphology as evidenced by small angle X-ray diffraction. In another embodiment, the heating is applied to textile products comprising propylene polymer fibers that have been subjected to one or more prior heat treating steps. In preferred embodiments, the process is utilized to manufacture improved fibers and yarns, including the novel fibers and yarns described hereinabove.

The textile products to which the invented process is applied are those that comprise propylene polymer fibers and can withstand heating at temperatures within about 20° C. of the propylene polymer melting point without damage to such other components or materials as may be present in such products. In the case of homopolymer polypropylene as the propylene polymer, melting point is about 168° C.; accordingly, textile products to be treated must be capable of being heated at 145 to 150° C. or higher without damage to other components of the product. Thus, for example, in the case of textile products comprising polypropylene fibers or yarn and other components composed of one or more thermoplastic resins that melts or softens appreciably at temperatures below about 150° C., the products may not be suitable for application of the invented process unless melting or softening of such resins and subsequent cooling and solidification thereof can be accomplished without unacceptable damage to, or loss of properties of, the final product. Subject to the foregoing, examples of textile products that can be treated according to the present invention include fibers, yarns, woven, nonwoven, knit and other fabrics and like structures, and composite structures such as carpets and rugs, upholstery, coated and laminated fabrics, stuffed articles and tufted apparel fabrics.

Heating at at least one temperature more than 0° C. but not more than about 20° C. below the propylene polymer melting point most preferably is conducted at as high a temperature as the textile product can withstand without damage, such as melting, softening or fusing of fibers or of other components of the product, in order to obtain optimum properties. For a given product, optimum temperatures will vary depending on factors such as composition and melting point of the propylene polymer of which the filaments are composed, the form and nature of the filaments themselves and the structure and composition of any other components of the product. From a practical standpoint, it may be difficult to exceed temperatures within about 2 to about 5° C. below the propylene polymer melting point without damage to filaments. Persons skilled in the art will appreciate that optimum temperatures for particular products will be ascertainable without undue experimentation. Preferred heating temperatures range from about 5 to about 15° C. below the propylene polymer melting temperature to obtain good properties while guarding against melting and fusion of fibers. If desired, heating can be conducted in two or more discrete steps, each at a higher temperature than the immediately preceding step. It also is contemplated to increase the temperature continuously from lower to higher temperatures or to increase the temperatures by small increments so as to achieve or approach essentially continuous increases in temperature.

Heating of the textile product at the heat treating temperature is conducted for a time effective to improve resiliency of the propylene polymer fibers or yarns of the textile product without thermally-induced damage to the fibers or yarns, such as melting or fusing of the same or development of a harsh texture or loss of hand due to softening and subsequent solidification of the fibers or yarns. Heating times are generally at least about two seconds. Precise residence time of a given textile product in heat treating will vary depending on the nature of the product being heated, heat transfer capability of the equipment used for heating and heat transfer medium used to conduct the treatment and the initial temperature of the product. Generally, hot water and condensing steam provide relatively rapid heat transfer and are effective at relatively short residence times. Forced hot air, heated roll systems and conventional hot air ovens typically provide increasingly slower heat transfer and require longer residence times. Residence time also is affected by the nature and form of the propylene polymer fiber contained in the product to be treated. For example, a highly bulked, loose, open yarn bundle will be more conducive to rapid heat transfer, and accordingly require shorter residence time, than a low bulk, tighter, more dense yarn bundle, other things being equal. Similarly, more dense, close weave fabrics and more densely tufted, heavier carpets take longer to equilibrate with heat transfer media than do less dense, open weave fabrics and lighter, less densely tufted carpets, respectively, other things being equal.

Heating of the textile product is conducted with the propylene polymer fibers of the product in a substantially relaxed state. Too much tension can destroy bulkiness, which in turn may diminish resiliency, and may also result in undesirable shrinkage and loss of aesthetic properties. Generally, the fibers can be under tension of up to about one-half gram per denier without appreciable adverse affects, with tensions of about 0 to about 0.1 gram per denier being preferred to maximize retention of bulk.

For carrying out the heat treatment, any suitable equipment for heating a textile product with propylene polymer fiber in a substantially relaxed state can be used. Examples include hot air and forced air ovens, heated roll systems, hot oil and water heating systems, superheated steam systems such as steam tunnels, infrared heaters and combinations thereof.

In one embodiment of this aspect of the invention, the above-described heating is applied to textile products comprising propylene polymer fibers characterized by small angle X-ray diffraction according to the technique utilized herein such that calculated values according to Formula (1) above are at least about 200 Å. Preferably, to ensure good resilience improvements by heat treating, the value calculated according to Formula (1) for the fibers of the textile product to be treated is about 200 to about 230 Å. Heating at a temperature that is below, but within about 20° C. of, the propylene polymer melting point preferably is conducted for a time effective to increase the calculated value according to Formula (1) by at least about 10% and, more preferably, at least about 20%.

According to a preferred embodiment of this aspect of the invention there is provided a process for treating BCF yarn comprising providing a BCF yarn comprising fibers comprising propylene polymer and characterized by small angle X-ray diffraction such that an average of $$\frac{L}{1.03\tan\alpha} \times \sqrt{-\log\frac{I_m(\alpha)}{I_m(0)}},$$

with the fibers positioned with their longitudinal axes inclined at angles, $\alpha$, of 10° and 20° from a perpendicular to the X-ray beam, is at least about 200 Å, wherein $I_m(0)$, $I_m(\alpha),(\alpha)$, L and the small angle X-ray diffraction are as defined above in connection with Formula (1), and heating the textile product with the fibers in a substantially relaxed state at at least one temperature below, but not more than about 20° C. below, the melting temperature of the propylene polymer.

The BCF yarn to which the heating step is applied can be obtained by any suitable technique. Such techniques generally involve the steps of melt spinning a thermoplastic resin comprising propylene polymer, and preferably homopolymer polypropylene, through one or more orifices to form one or more fibers, gathering the fibers into yarn, orienting the fiber or yarn and bulking the yarn, with conditions being selected so as to develop in the yarn a crystalline microstructure corresponding to the above-described small angle X-ray diffraction characterization.

For purposes of this embodiment of the present invention, crystalline morphology that provides Formula (1) calculated values of about 200 to about 230 Å is promoted by melt spinning under conditions that induce melt stress and crystallinity. Relatively low spinning temperatures are preferred for this purpose; however, melt viscosity of the resin being spun typically increases with decreasing temperatures. Accordingly if the spinning temperature is too low, crystallinity and melt stress may be achieved at the expense of process continuity. It also is important to avoid spinning temperatures that are too high because the same can lead to polymer degradation, inferior fiber and yarn properties and inadequate melt viscosity for smooth process operation. For commercially available, propylene homopolymer resins of the type typically used for fiber spinning, temperatures generally ranging from about 205 to about 320° C. are suitable, with about 210 to about 250° C. being preferred to achieve a good balance between promoting melt stress and crystallinity and achieving smooth process operation and good overall fiber properties.

Conditions used in orientation of the spun fibers also can influence attainment of suitable crystalline morphology of the propylene polymer of the fibers. In conventional BCF yarn manufacturing processes orientation typically is accomplished by stretching or drawing the fibers to at least about three times their original length, i.e., at draw ratios of at least about 3:1. For purposes of the present invention, relatively low draw ratios promote desirable crystalline morphology in the fibers to be treated, with ratios of about 1.2:1 to about 3.5:1 being preferred and about 1.5:1 to about 2.5:1 being more preferred. Persons skilled in the art will appreciate that at such draw ratios, strength of the fibers and yarns comprising same will not be as great as that of fibers and yarns drawn at the conventionally used higher draw ratios. Accordingly, if the yarns to be treated according to this aspect of the invention are subjected to other processing steps, such as twisting or cabling, operation of such other steps at low speeds or other precautions may be appropriate to account for the lower strength.

Another step that can be used to promote attainment of suitable crystalline morphology in the fibers of the starting yarns is to subject the yarns to be heat treated according to this embodiment of the invention to preliminary heating at one or more temperatures lower than about 20° C. below the propylene polymer melting point with the fibers in a substantially relaxed state and, preferably, under tension not greater than about one-half gram per denier. Such preliminary heating can serve to condition the yarns for subsequent, higher temperature heat treatment so that they can withstand heating at temperatures approaching the polypropylene melting point without undesirable surface damage, loss of bulk and aesthetics and development of crispiness. If preliminary heating at more than one temperature is conducted, temperature can be increased in steps or continuously. Residence time for such preliminary heating varies with equipment capabilities, choice of heat transfer medium and nature of the yarn being treated. Preliminary heating most preferably includes at least one step in which the yarn is heated at least one temperature in the range of about 20 to about 40° C. below the melting point of the propylene polymer. In the case of polypropylene homopolymer as the propylene polymer, preliminary heating most preferably includes at least one temperature of about 130 to about 145° C. For preliminary heating at about 130 to about 145° C. of polypropylene bulked, continuous multifilament yarns having bulk levels of up to about 20%, preferred residence times are at least about two seconds in the case of condensing steam or hot water as the heat transfer medium, at least about one minute in the case of forced hot air systems and at least about five minutes in the case of hot air and heated roll systems.

Most preferably, the starting yarns to be heat treated according to this embodiment of the invention are obtained by a process comprising a combination of two or more of the spinning, drawing and preliminary heating steps under conditions as described above. Best results are achieved with starting yarns prepared by melt spinning filaments of a thermoplastic resin composition comprising propylene polymer at a temperature and under conditions effective to induce melt stress and crystallinity, drawing the filaments at a draw ratio of about 1.2:1 to about 3.5:1 and heating the filaments in a substantially relaxed state at at least one temperature about 20 to about 40° C. below the melting temperature of the propylene polymer. When the propylene polymer comprises polypropylene homopolymer, melt spinning most preferably is at about 210 to about 250° C., the draw ratio most preferably is about 1.5:1 to about 2.5:1 and heating most preferably is at about 130 to about 145° C. under tension of about 0 to about one-half gram per denier.

Heat treating of the starting yarns comprising filaments having crystalline morphology as described above is conducted at at least one temperature that is below the propylene polymer melting point, but not more than about 20° C. below such melting point, and with the fibers making up the yarn in a substantially relaxed state. Preferred temperatures are about 5 to about 15° C. below the melting temperature of the propylene polymer to maximize improvements in the treated yarns. Most preferably, heat treatment of yarns comprising filaments composed of homopolymer polypropylene is conducted at about 150 to about 160° C. Heating is conducted for a period of time effective to increase the value calculated according to Formula (1) for the fibers of the treated yarns above the value calculated with respect to the fibers of the starting yarn. Preferably heating time is such that the increase is at least about 10% and, more preferably, at least about 20%. Specific treating times vary with the nature of the heating system. When heating with hot water or condensing steam, heat treatment for at least about two seconds is effective. With forced hot air as the heat transfer medium, treatment times are at least about one minute. When heating with hot air or heated rolls, treatment is conducted for at least about five minutes. Among these heat transfer media, condensing steam and hot water are preferred to maximize throughput of the treating system. Preferred heating times with a given heat transfer medium vary with line speeds and process economics and can be determined by persons skilled in the art. Other heating systems or heat transfer media, such as heated roll systems, superheated steam and infrared heaters can be used. Treatment times for these can be determined by persons skilled in the art without undue experimentation. Heating is conducted with the fibers in a substantially relaxed state in order that any bulk or texture of the fibers be retained. Preferably, the fibers are under tension no greater than about one-half gram per denier and, most preferably, from 0 to about 0.1 gram per denier.

In another embodiment of this aspect of the invention, heat treating below but within about 20° C. of the propylene polymer melting point with fibers in a substantially relaxed state is applied to a textile product comprising melt spun, oriented, bulked, continuous multifilament yarns that have been heated under prescribed conditions. Preferably, the textile product is a BCF yarn prepared by a process comprising spinning molten thermoplastic resin comprising propylene polymer at about 205 to about 270° C. through at least one orifice to form molten filaments, quenching the molten filaments, gathering the filaments into yarn, drawing the filaments or yarn at a draw ratio of about 1:1 to about 3.5:1, texturing the yarn to a bulk level of about 2 to about 20%, heating the yarn with its filaments in a substantially relaxed state at at least one temperature in the range of about 20 to about 40° C. below the propylene polymer melting temperature and thereafter heating the yarn in a substantially relaxed state at least one higher temperature in the range of about 20° C. less than the melting temperature of the propylene polymer up to, but below, the melting temperature.

Resins used for melt spinning according to this embodiment of the invented process comprise propylene polymer. For purposes of this aspect of the invention, it is preferred that no more than about 30 weight % polymerized comonomer units or blended resins be present in order to maintain smooth process operation, with up to about 10 weight % being more preferred. Propylene homopolymer resins are most preferred, with general-purpose resins in the nominal melt flow range of about 3 to about 35 g/10 min., and especially about 8 to about 20 g/10 min., being best suited. Most preferred resins are those having a nominal melt flow rate of about 12 to about 18 g/10 min. Preferred resins have weight average molecular weight to number average molecular weight ratios of about 2:1 to about 7:1. If melt flow rates are too high, polymer degradation, inferior fiber properties and processing difficulties can result. Melt flow rates that are too low can result in poor spinning due to high melt viscosity of the resin.

The propylene polymer resin used for spinning fibers also can contain various additives and modifiers. Examples include pigments, processing aids, heat and light stabilizers, flame retardants, antimicrobial agents, nucleating agents and electrically conductive materials. Specific materials for various purposes are well known to persons skilled in the art and are discussed above.

In melt spinning, melt temperature can range from about 205 to about 320° C. but preferably is kept low to induce melt stress and crystallinity. Temperatures from about 205 to about 270° C. are preferred. Melt viscosity increases with decreased temperature and can interfere with process continuity; however, too little melt viscosity and polymer degradation resulting from higher processing temperatures also may be disadvantageous. A more preferred temperature range for general purpose polypropylene homopolymer resins is about 210 to about 250° C. and, most preferably, about 215 to about 235° C., in order to achieve a good balance between fiber and yarn properties and smooth process operability.

Molten resin is conveyed to a spinnerette having one or more orifices from which the molten resin issues in the form of one or more filaments. Dimensions of the spinnerette orifice or orifices are selected based on desired filament cross-sections and deniers. For round cross-sectioned filaments, diameters of about 0.5 to 1.5 mm and capillary length-to-diameter ratios of about 2:1 to about 10:1 are preferred for manufacture of filaments from propylene homopolymer resins to provide appropriate capillary shear and material throughput with good flow. Shape of the spinning orifices is not critical. Round and delta cross-sections are commonly used for many applications; however, tri- and quadrilobal, cross and dumbbell-shaped cross-sections as well as more complex configurations also are suitable.

After issuance of filaments from the spinnerette hole or holes, the filaments normally are quenched, typically by contact with a quench medium such as cool air or other gas, to solidify the molten resin. Suitably, quench medium temperature ranges from about 5 to about 25° C. Air is a preferred quench medium due to its relatively low cost. It is preferred that quench air temperatures in the range of about 10 to about 20° C. be used to provide effective quenching without need for more expensive cooling. Velocity of quench air or other fluid is maintained at a level effective to provide rapid cooling without tangling of filaments. Preferably, velocity is kept below about 90% of that at which filaments may touch and stick as they emerge from the spinnerette, also known as the "tangle velocity." The most desirable quench device is a cross-flow type chamber or cabinet configured to provide a flow of air or other quench fluid in a direction substantially perpendicular to the path of the filaments emerging from the spinnerette. However, radial quench systems can be used effectively as part of compact spinning systems, the latter being well suited for operation of this embodiment of the invented process in view of their capabilities for providing high melt draw and relatively low denier in undrawn filaments, both of which can be beneficial in the invented process.

Orientation of the fibers is accomplished by stretching the same. This is conveniently conducted with a plurality of filaments gathered together. In this embodiment of the invention, orientation is conducted using draw ratios of about 1.2:1 to about 3.5:1, with draw ratios in the range of about 1.5:1 to about 2.5:1 being preferred to maximize resilience of yarns. Drawing preferably is conducted at elevated temperatures to facilitate stretching of the yarns. Suitably, temperatures about 20 to about 50° C. below the melting point of the propylene polymer of which the filaments are comprised are employed, with about 25 to about 40° C. below the melting temperature being preferred. For filaments of homopolymer polypropylene, drawing preferably is conducted at about 120 to about 150° C. and, more preferably, at about 125 to about 145° C. to achieve a good balance of yarn properties and process efficiency.

Texturing of the drawn yarn can be conducted by any suitable technique. Texturing preferably is conducted using fluid jet texturizers. A wide variety of jet devices are known and generally comprise a hollow, cylindrical or conical body with yarn inlet and outlet ports at opposing ends of the body, one or more fluid inlet ports in the body wall for introducing air or other fluid, typically at high velocity, from an external source into the interior of the body and one or more baffles or channels within the interior of the body for promoting turbulence of the fluid. In operation, yarn is passed through the jet device and the high speed fluid entrains individual filaments or groups of filaments of the yarn causing them to loop, whirl and tangle, thereby producing bulk and texture in the yarn. The fluid used for texturing typically is at elevated temperature both to promote stress relaxation in the filaments of the entering yarn and to set the texture imparted to the yarn. Texturing jet temperature can be adjusted to provide control over the level of bulk introduced into yarns. Typically, texturing temperatures of about 20 to about 70° C. below the propylene polymer melting point are employed, with about 100° C. to about 140° C. being preferred for texturing yarns with filaments of homopolymer polypropylene.

As discussed in detail hereinabove, resilience of yarns, as measured by the Plug Crush Recovery test, has been found to increase as percentage bulk increases up to about 10%, and then to decline with increasing values. Above about 20% bulk, resiliency of yarns may be so low due to their open, loose configuration that there may be little practical benefit in terms of resilience in carrying out the invented process with respect to such yarns.

Other bulking techniques also are suitable. Examples include stuffer box crimping or texturing, texturing by drawing filaments over an edge, knitting and de-knitting, and false twisting and untwisting. Such techniques are known to persons skilled in the BCF yarn art.

If desired, the drawn, textured yarns can be twisted or subjected to other processing steps or conversion operations, including conversion to textile products. The preferred draw ratios used according to this embodiment of the invention tend to produce yarns of lower tensile strengths than are achieved with conventional yarns drawn at higher draw ratios. With yarns having tenacities lower than about 4.5 g/denier, attention should be given to twisting operations to assure that individual filaments and yarns are not elongated by twister mechanisms, that loops are not created and that spinning tensions do not cause increases in broken ends. Likewise, in other optional processing steps and conversion operations, precautions may be appropriate to account for lower tensile strengths resulting from low draw ratios.

The drawn and bulked yarns are then subjected to heating according to this embodiment of the invented process. Heating is conducted at at least two temperatures. Yarn is first conditioned by exposure to at least one temperature about 20 to about 40° C. below the propylene polymer melting point. This treatment prepares the yarn for subsequent exposure to higher temperature. Without preliminary heating at about 20 to about 40° C. below the melting point, yarns can experience surface melting and fusing of their filaments such that they take on a crispy texture, poor hand and loss of aesthetics, thereby rendering them unsuitable for most textile applications. As a result of this preliminary heating, crystals of propylene polymer of which the fibers of the yarn are composed are made more perfect, Apparent Average Microfibril Diameters tend to increase, long-periods tend to lengthen and the fibers are enhanced in their ability to withstand higher temperatures without surface melting, fusion and development of crispiness. Increases in Apparent Average Microfibril Diameter of about 10 to about 35% are typical. For filaments of homopolymer polypropylene, increases from about 160 to about 175 Å to about 200 to about 220 Å have been observed as a result of treatment at about 130 to about 145° C.

The yarn is then heated at least one temperature higher than about 20° C. below the propylene polymer melting point but below the melting point. Preferably, this heating is conducted in a separate step from the prior heating at about 20 to about 40° C. below the melting point because temperature and times of heating are more conveniently and accurately controlled. However, heating at the different temperatures can be conducted in a single step if the heating system is maintained at a temperature below but no more than about 20° C. below the propylene polymer melting temperature and heat transfer is slow enough, for example due to inefficiency of the heat transfer medium or mass of the yarn being treated, that the yarn is effectively heated at the lower, conditioning temperature as it equilibriates with the heat transfer medium. A disadvantage of such a process is that it is a slow, batch process. On the other hand, ovens or other systems in which yarns can be brought quickly to equilibrium can accomplish the overall heating more rapidly and at higher throughputs. However, temperature conditions in such ovens normally remain fixed and, accordingly, multiple stages or devices are typically required for more than one treatment temperature. In a continuous operation, two or more separate heating devices or a single device with multiple heating zones preferably are used for economical, efficient operation.

Minimum heat treatment times associated with various systems and heating media for both heating temperature ranges are as follows, with "T" designating the heat treatment temperature range and propylene polymer melting temperature being designated "Tm":

and economics is that yarns may subsequently need to be dried.

Heating is conducted with the yarn in a substantially tension-free state and, preferably, with the bulk of the yarn fully developed. Heating temperatures preferably exceed those used in texturing and, therefore, yarn texture is reset during heating in whatever state the yarn is in during such heating. A substantially tensionless state may also be beneficial to attainment of crystalline microstructure changes and improved resilience. Suitably, tension on the yarn is no greater than about one-half gram per denier, with about 0 to about 0.1 gram per denier being preferred to optimize retention of bulk.

Mechanisms for restoring bulk in the heat treated yarns, e.g. after being wound into packages and storage, are not different from those of other bulked continuous filament yarns. Yarn can be rebulked by mechanical action, exposure to heat or a combination of both. Sufficient bulk development can be achieved by exposure of yarns to temperatures of about 100 to about 130° C. in forced steam or forced air environments. The active air stream provides mechanical action and uniform heating of the filaments.

Yarns can be subjected to other processing or treatments following heating. Preferably, such subsequent processing or treatment is conducted at temperatures below the highest temperature to which the yarn was exposed during heating. Examples of such further processing or treatment include twisting, cabling, and procedures for setting of twist of plied or cabled yarns and for setting of convolutions in the yarn imparted to change aesthetics, increase bulkiness or for other purposes. The yarns also can be converted to textile products.

Yarns prepared according to this embodiment of the invented process are well suited for use in the textile products described herein in connection with the invented fibers and yarns. Preferred yarns prepared according to this embodiment of the process comprise fibers characterized by the small angle X-ray diffraction method utilized herein such that the value calculated according to Formula (1) is at least about 240 Å, and more preferably, at least about 250 Å. Plug Crush Recoveries of the yarns are at least 80% and, preferably at least about 85%, with values of or exceeding 87% frequently being attained. Properties of the yarns suited for various end uses are as described above in connection with the invented fibers and yarns and can be attained by appropriate selection of process conditions and equipment and raw materials, as will be appreciated by those skilled in the BCF yarn art.

Any suitable apparatus capable of heating a textile product at the required temperature or temperatures with the

| Heat Transfer Method | Time at T = Tm-20 to 40° C. | Time at Tm-20° C. ≦ T < Tm |
|---|---|---|
| Hot Air | 5 min. | 15 min. |
| Forced Hot Air | 1 min. | 1 min. |
| Heated Rolls | 5 min. | 5 min. |
| Condensing Steam | 2 sec. | 2 sec. |
| Hot Water | 2 sec. | 2 sec. |

It can be seen from the above that hot air systems and conductive heat transfer systems are less effective than systems in which the yarn is directly exposed to steam and water. Although water immersion is an effective heat transfer technique, a possible disadvantage in terms of process speed fibers in a substantially relaxed state can be used to carry out the heat treatment according to the invented process. Batch operations can be conducted using one or a series of heating devices heated at the appropriate temperature or temperatures. Continuous operations allow higher throughputs but are more complicated mechanically due to the need to balance line speeds, efficiency of heat transfer media for heating the textile product and the need for conveying the product through one or more temperature zones without application of significant tension on the fibers of the product. Moving belt or screen conveying systems or drum or roll systems can be used to pass the product through one or more heating zones maintained at appropriate temperature or temperatures or through a single system capable of operating at such temperature or temperatures. Hot air, hot water and steam heating systems are suitable for most applications although hot air is a less effective heat transfer medium than steam or hot water. While steam and hot water are faster, steam pressurizing equipment typically is expensive and heating by immersion in hot water requires subsequent drying of the textile product. Other heating systems, such as infrared heaters, also can be employed if desired.

For BCF yarns, a preferred apparatus for conducting heat treatment by the invented process comprises a chamber equipped with means for circulating a heat transfer medium therethrough and having at least two compartments capable of being maintained at independent temperatures and means for passing a yarn through the compartments with the yarn in a substantially relaxed state.

The chamber can be configured in any suitable manner. It should be sized to accommodate the desired number of compartments and appropriate yarn dwell times in each, taking into account the speed at which yarn will be passed through the compartments and efficiency of the heat transfer medium for heating the yarn. A preferred chamber design is a tube or tunnel.

The chamber is equipped with means for circulating heat transfer medium therethrough. Generally, such means include at least one source of heat transfer medium, means for heating the medium and means associated with the source and configured to provide a path for flow of the medium to, into and through the compartments into which the chamber is divided and then out of the chamber. When using hot air as the heat transfer medium, one or more blowers or fans typically is used as the source and one or more electric heaters can be used as the heating means. If condensing steam is used as the heat transfer medium, the source can be a perforated steam pipe which may be used with or without a water bath. With either hot air or steam, the heat transfer medium can be introduced into the chamber through an inlet, circulated to and through the compartments via appropriately configured baffles and then out of the chamber through a suitable outlet. When using steam, provision also must be made for removal of liquid water that may condense. A suitable outlet or drain in the bottom of the chamber is effective.

The chamber has two or more compartments capable of being maintained at independently controlled temperatures. Suitably, insulated walls or partitions are used to divide the chamber into the desired number of suitably configured compartments. Dimensions of the compartments can be the same or different. For conveying systems that operate at a constant speed throughout all compartments, suitable adjustment of compartment lengths affords a way to control residence times of the yarn being treated in the individual compartments. Independent temperature control is conveniently achieved through the use of independently controlled heating means, such as one or more electric heaters or steam inlets located within the individual compartments of the chamber. The number of compartments within the chamber can be selected based on the particular heat treating steps and temperatures to be employed. Thus, while at least one compartment must be present for heating at about 20 to about 40° C. below the propylene polymer melting point and at least one other compartment must be present for heating below but within about 20° C. of the propylene polymer melting point, one or more additional compartments also can be present for preliminary or intermediate heating steps or for other processing steps or a combination thereof. In a particularly preferred embodiment, the chamber is divided into four compartments. A first compartment is used for preliminary heating, for example at up to about 40° C. below the melting point to maximize bulk development in the yarn. Second and third compartments function to heat the yarn at a first heat treating temperature and then at a second, higher heat treating temperature. A final compartment is used to heat the yarn at a still higher temperature.

Yarn is conveyed through the heating chamber by any suitable means capable of doing so at a speed that will provide suitable residence times in the compartments of the chamber and maintaining the yarn in a substantially relaxed state. Examples include moving belt or screen conveying systems, drum or roll systems and transport masts, such as in the form of an essentially cylindrical shaft, around which yarn can be wrapped or coiled in a substantially tension-free state. The latter is a preferred conveying means because it affords good tension control and is easily integrated with upstream and downstream yarn manufacturing or processing equipment. Any suitable means for coiling bulked yarns around such a mast or shaft in a substantially relaxed state can be employed to feed yarns to the mast. Examples include flywheel-type winder systems. For removing yarns from the mast, flywheel or other suitable takeoff devices can be utilized. Configuring the mast so that its circumference decreases from the feed end to the takeoff end thereof is a convenient way to compensate for tension that may be exerted on the yarn by the takeoff means so as to maintain the yarn on the mast in an essentially tension-free condition.

Figure 5:
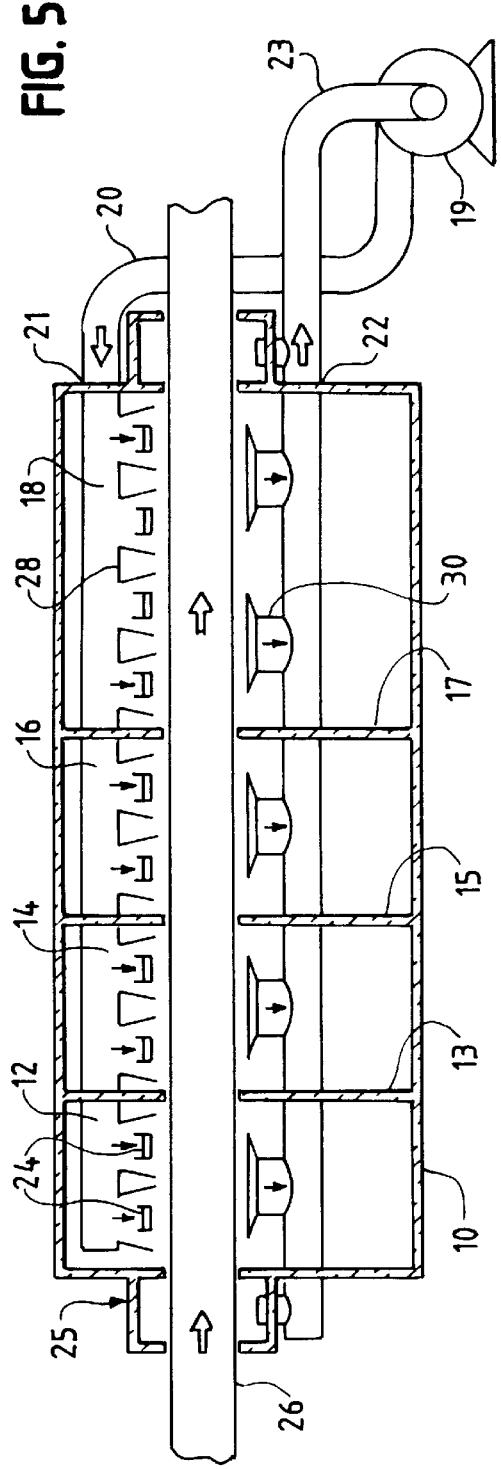
FIG. 5, a cross-sectional view depicting the interior of an apparatus for carrying out the invented process.

An apparatus for heat treating bulked, continuous filament yarn according to the invented process using forced hot air is depicted in FIG. 5. Chamber 10 is divided into compartments 12, 14, 16 and 18 by insulated partitions 13, 15 and 17. Blower 19 functions as a source of heat transfer medium, in this case forced hot air, and communicates with the chamber through inlet line 20, inlet 21, outlet 22 and outlet line 23. Electric heaters 24 are associated with each of compartments 12, 14, 16 and 18 so that air flowing thereover is heated to the appropriate temperature. Air flow through the chamber follows a flow path defined by baffles 28 and ducts 30. Passage of hot air out of the chamber is prevented by air locks 25. Transport mast 26, in the form of a cylindrical shaft, is disposed within the chamber to convey a yarn therethrough and through compartments 12, 14, 16 and 18 in a substantially relaxed state. The yarn path around the mast is not shown; in normal operation, yarn is coiled around the mast a suitable number of turns per unit length, based on bulk density of the yarn. While FIG. 5 illustrates apparatus having a single mast for conveying yarn through the chamber, those skilled in the art will appreciate that a plurality of masts can be employed to increase throughput of yarns through the heat treating apparatus. Yarn is fed to mast 26 by a coiling device, not shown, and can be removed from the mast by suitable takeoff means, also not shown, such as a winder or other takeup device.

Figure 6:
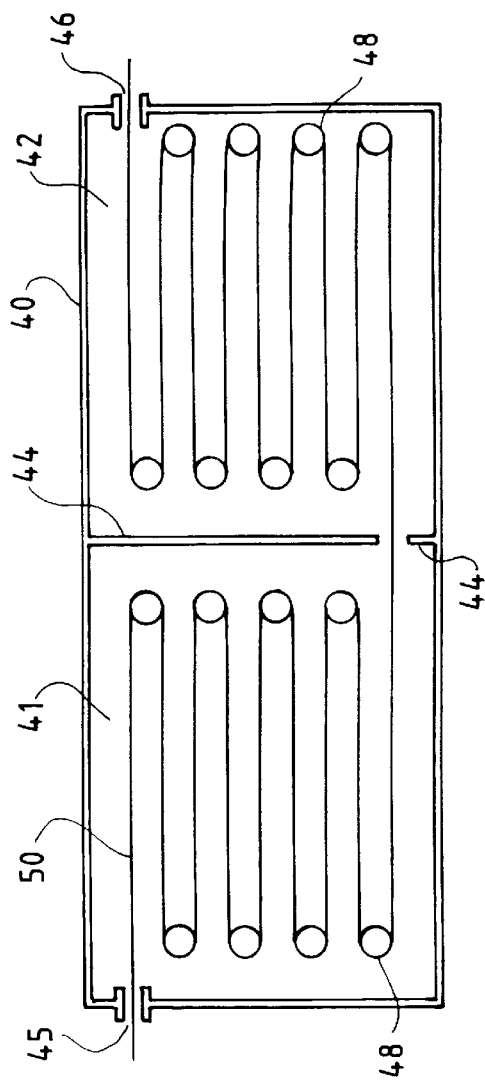
FIG. 6, a cross-sectional view depicting the interior of an alternate system for carrying out the invented process.

Another system for conducting the heat treatment is depicted in FIG. 6. Oven 40 includes two chambers 41 and 42 separated by partition 44 which is configured so as to allow passage of yarn or other textile product from one compartment to the other. The oven also includes ports 45 and 46 for feeding and removing yarn or other textile product therefrom. Compartments 41 and 42 are equipped with independently controlled heating means (not shown) and communicate with one or more sources of heat transfer media (also not shown). Guide rolls 48 are used to define a path for yarn 50 within each of the chambers and between them. While four roll pairs are shown in each chamber in the system depicted in FIG. 6, it will be appreciated that numbers and configurations of the rolls can be varied within each chamber to achieve any desired yarn path. Passage of yarn along the path defined by the rolls can be accomplished with the yarn in a substantially relaxed state by overfeeding the yarn such that upstream rolls rotate faster than downstream rolls, by utilizing spring mounted rolls or other suitable techniques.

The invention is described further in the following examples, it being understood that the same are for purposes of illustration but not limitation. In the following, Plug Crush Recoveries and bulk levels of yarns were measured, and small and wide angle X-ray diffraction was carried out, according the following procedures.

Plug Crush Recovery

Briefly, the Plug Crush Recovery test involves compressing a yarn plug of prescribed height and weight in a cylindrical form with a prescribed force and measuring height of the plug after recovery. Sample sizes and test conditions vary somewhat depending on yarn type. Details are provided for untwisted and twisted BCF yarns.

For untwisted BCF yarns a one gram sample is used. To determine the approximate number of yarn ends needed for the 1-gram sample, the sample weight (1 gram) is multiplied by 236,220 and divided by the yarn denier. This conversion factor is derived from the following:

(9000 meters×39.37 inches/meter)/1.50 inches where: 9000 is the yarn length upon which the denier yarn numbering system is based, and 1.50 is the length of the specimen.

A skein reel with a circumference of 1.0 meter or 1.5 yards obtained from the Alfred Suter Company, Orangeburg, N.Y. is used in preparing samples with the proper number of yarn ends. Yarn is threaded through a guide that is part of the skein reel unit and is attached to the skein reel. The reel is rotated to wind the yarn onto the reel. The number of skein reel turns is one half of the number of yarn ends required. The number of turns required is typically 75 to 100. Higher denier yarns require fewer turns. The skein length—two meters or three yards—is sufficient to make three to five specimens. When the required number of skein reel turns has been made, the yarn is cut and a loop is tied around the skein at a reel arm opposite the arm at which the end is cut. The skein is then cut at the same point where the yarn was cut. The result is a bundle of yarns which contains the predetermined number of ends. The cut skein is placed onto a wooden dowel which is then placed into a forced-air oven, such as a Blue M oven, model DC-3366, heated to 132±2 degrees C. The yarn is heated for 10 minutes. This heating is conducted to allow the bulk of the yarn to reform after having been wound onto a package or otherwise having had its bulk temporarily removed to thereby take full advantage of the original yarn bulk for resisting deformation from compression. The rebulked skein is removed from the oven and allowed to equilibrate to standard laboratory conditions for at least 16 hours. The yarn is not handled or otherwise mechanically disturbed during the equilibration time period.

In preparing specimens for compression, latex gloves are worn when handling yarn and specimen holders.

For forming and holding test samples, a glass cylinder having a length of 1.5 inches and an inside diameter of 1.0 inch is used. A double thickness of the skein is inserted into the cylinder, and the individual yarns are aligned with respect to the length of the cylinder and each other. A length from the skein of approximately 15 inches is pulled through the cylinder to assure that the ends are not tangled and are parallel. The specimen yarn that protrudes from the cylinder is cut with scissors approximately ¼-inch from each end of the cylinder. The specimen is precisely trimmed flush to the ends of the specimen holder using hair clippers of the type commonly available from laboratory instrument supply sources. The specimen is weighed while in the holder. Single ends of the specimen are removed until the mass of the specimen equals 1.0±0.15 grams. If the mass of the specimen is initially less than 0.85 grams, then the skein is discarded.

For compression testing, a button press made by Buehler Ltd., Lake Bluff, IL and having an inside diameter of 1.0 inch and an outside diameter of 1.75 inch is used to contain the specimen during compression. An open space runs throughout the length of the button press. A steel plug having a diameter of 1.0 inch and a height of 0.6 inch is placed inside and at the base of the open space. The specimen is transferred from the specimen former/holder to the button press by carefully aligning the former/holder with the open space and pushing the specimen into the button press using a button press ram. This ram is 2.5 inches long, has a diameter of 1.0 inch, and is machined to have a precise fit inside the chamber of the button press. The ram weighs 227 grams. Once the specimen has been transferred to the button press, the button press ram is left inside the open space; thus, the yarn specimen is located inside the button press between the steel plug and the button press ram.

A Carver Hydraulic Press, Model C, with a capacity of 12 tons and equipped with a time and motorization package and safety shield is used for compressing the specimen. Compression is at a pressure of 1,600 psi which corresponds to a compressive force of 1,260 pounds. The force gauge on the Carver Press is set to 1,260±20 pounds. The button press containing the specimen located between the steel plug and the button press ram is centered on the base platen of the press. The press ram is brought into contact with the button press ram, and a pressure of 1,600 psi is applied and held for 5.0 minutes (300 seconds). The press ram is then retracted and the pressure is immediately relieved. The button press is removed from the Carver Press, and the button press ram is used to push the steel plug from the button press through pressure applied to the specimen. Care is taken not to push any part of the yarn specimen from the button press. A glass retaining ring having an inside diameter of 1.0 inch and a height of 0.5 inch is aligned with the open space of the button ram from which the steel plug was removed. The specimen is then pushed slowly into the retaining ring using the button press ram. The retaining ring is then used as a support base for the specimen, and the specimen and retaining ring placed on a benchtop with the retaining ring down.

During compression, the yarns may be forced onto their sides (from the vertical). Any mis-alignment of the yarns can be seen through the walls of the glass retaining ring. When this occurs, the specimen is pushed partially from the end of the retaining ring. The emerging yarns will self-straighten. After the yarns are straightened, the specimen is pushed to the opposite end of the retaining ring, allowing yarns at that end of the specimen to straighten. Once aligned, the specimen is pushed back into the retaining ring and the end of the specimen is made flush with the end of the retaining ring.

After straightening the individual yarns, the specimen is allowed to recover from compression for 16.0 hours.

A Mitutoyo low pressure indicator is used to measure the recovered height of the specimen. A metal disk which has a diameter of 0.995 inch, a height of 0.049 inch, and a mass of 2 grams is placed on top of the specimen. A presser foot of the Mitutoyo gauge applies a force of 0.0225 psi which, when added to the force from the metal disk, exerts a pressure of 0.0282 psi. The recovered height is measured to the nearest 0.001 inch.

Plug Crush Recovery is the recovered height divided by the initial height (1.0 inch) expressed as a percentage. For example, a sample that recovers to a height of 0.6 inch has a 60% recovery. The standard deviation of single test results measured on like materials is 2.53% compression recovery units. A single test result is obtained from a sample of five measurements from one test unit (yarn package). The standard error of measurements would be dependent upon the number of test units (yarn packages) tested.

For twisted BCF yarns, a four gram yarn sample is used. A skein of yarn is formed using the skein reel as described above except that to determine the approximate number of yarn ends needed for the 4-gram sample, the sample weight (4 grams) is multiplied by 354,330 and divided by the yarn denier. The skein length—two meters or about three yards—is sufficient to make three to five specimens. The length of yarn in the skein is typically 50–100 meters, with a higher denier yarn having shorter lengths. The skein is cut, as described above, and the cut skein is put into a protective, open-weave mesh fabric which is placed into a forced air oven for rebulking. Typically, a Blue M oven, model OV490A-3 has been used. Oven temperature is 132±2 degrees C., and the residence time is 10 minutes. The rebulked skein is removed from the oven and allowed to equilibrate to standard laboratory conditions for at least 1 to 4 hours. The yarn must not be handled excessively or otherwise mechanically disturbed during the equilibration time period.

A copper or steel cylinder having a length of 1.0 inch and an inside diameter of 1.0 inch is used as a specimen former and holder. With the ends of the skein being allowed to hang free, all of the ends are inserted into the cylinder and aligned with respect to the length of the cylinder and each other. A length from the skein of approximately 15 inches is pulled through the cylinder to assure that the ends are parallel and not tangled. The specimen yarn that protrudes from the cylinder is cut with scissors approximately ¼-inch from the ends of the cylinder. The specimen is precisely trimmed using a Wolf Blazer Series II saw. This saw is available from the Wolf Machine Company, Cincinnati, Ohio. The cylinder is placed in the saw holder and the protruding yarns are trimmed systematically, following the manufacturer's instructions for operation, until the surface of the plug is flush with the ends of the cylinder. The specimen is weighed while in the holder. Single ends of the specimen are removed until the mass of the specimen equals 4.0±0.015 grams. Balances used in determining the weight of the specimen must be accurate to 0.0001 gram. If the mass of the specimen is initially less than 3.985 grams, then the skein is discarded.

A button press made by Buehler Ltd., Lake Bluff, Ill. and having an inside diameter of 1.0 inch and an outside diameter of 1.75 inch is used to contain the specimen during compression. The open space runs throughout the length of the button press. A steel plug having a diameter of 1.0 inch and a height of 0.6 inch is placed inside and at the base of the open space. The specimen is transferred from the specimen former/holder to the button press by carefully aligning the former/holder with the open space and pushing the specimen into the button press using the button press ram. This ram is 2.5 inches long, has a diameter of 1.0 inch, and is machined to have a precise fit inside the chamber of the button press. The ram weighs 277 grams. Once the specimen has been transferred to the button press, the button press ram is left inside the open space; thus, the yarn specimen is now located inside the button press between the steel plug and the button press ram.

A Carver Hydraulic Press, model C with a capacity of 12 tons and equipped with a time and motorization package and safety shield is used for compressing the specimen. The specimen is compressed at a pressure of 10,000 psi which corresponds to a compressive force of 7,800 pounds. At this compressive force, the pressure on a specimen in the 1-inch diameter open space of the button press is 10,000 psi.

The button press containing the specimen located between the steel plug and the button press ram is centered on the base platen of the Carver press. The press ram is brought into contact with the button press ram, and a pressure of 10,000 psi is applied and held for 2.0 minutes (120 seconds). At that time, the press ram is retracted. The button press is immediately removed from the Carver press, and the button press ram is used to push the steel plug from the button press. Care is taken not to push any part of the yarn specimen from the button press. A copper or steel retaining ring having an inside diameter of 1.0 inch and a height of 0.5 inch and a known weight is aligned with the open space of the button ram from which the steel plug is removed. The specimen is then pushed slowly into the retaining ring using the button press ram. When the specimen is slightly above the retaining ring height, the retaining ring is used to extract the remainder of the specimen from the button press. The retaining ring is then used as a support base for the specimen, and the specimen and support ring placed on a benchtop with the retaining ring down.

The specimen is allowed to recover for 30.0 minutes. The recovered height of the specimen is then measured using an Ames Thickness Gauge, model 81-0453. The presser foot of the pressure gauge is 1.0 inch and a load of 15 grams is applied to the presser foot.

Plug Crush Recovery is the final height divided by the initial height (1.0 inch) expressed as a percentage. The standard deviation of single test results of compression recovery measured on like materials is 2.50% compression recovery units. A single test result is obtained from a sample of five measurements from one test unit (yarn package). The standard error of measurements would be dependent upon the number of test units (yarn packages) tested.

Bulk Level

Lengths of yarn approximately 15 yards long are wrapped five times to form a skein and then knotted with an overhand knot at one end and placed into a bag prepared from an open weave fabric with sufficient openness of the weave to allow ready circulation of air into and out of the bag. The bag has side, top and bottom dimensions of about eight inches. The bag is placed in a Blue M model OV-500 oven preheated to 132° C. After two minutes the bag is removed from the oven, the yarn is removed from the bag and the knotted end of the yarn is clamped into a bulk release tester just to the right of the knot. The bulk release tester consists of a clamp at one end and a calibrated free wheel with a pointer at another end. Diameter of the wheel is about 88 mm and it is located about 758 mm from the clamp. The wheel is calibrated in ten degree intervals to register bulk as a percentage by which length of a yarn sample that is fully extended to remove its bulk exceeds length of the bulked yarn.

A strand of the yarn is untangled from the skein and a loop knot is clamped in its free end. The yarn is then placed over the free wheel and a pretension weight corresponding to 0.02 gram/denier is hung from the loop. The zero mark of the wheel is aligned with the pointer on the wheel. A weight corresponding to 0.5 gram/denier less the pretension weight is then hung from the loop in the end of the yarn. The number closest to the pointer in the friction wheel when the yarn is first subject to the weight is recorded as the bulk level of the yarn.

Small Angle X-ray Diffraction

Small angle X-ray measurements were performed using a Rigaku Rotoflex X-Ray Diffractometer with a small angle goniometer and maximum power of 12 kw. The diffractometer had a rotating anode-type X-ray generator with a copper anode producing CuKα radiation with wavelength of 1.5418 Å. A nickel filter was used. The cathode filament was 0.5 mm wide and 10 mm long. A source slit having width of 0.16 mm was located at a distance of 88 mm from the anode focal point. A second, collimating slit having width of 0.03 mm was located at a distance of 100 mm from the first slit. A micrometer-controlled adjustable knife edge, or slit, was located a distance of 42 mm from the collimating slit. A sample holder was located in the center of the goniometer. Distance from the anode focal point to the sample was 250 mm. Collimation produced an X-ray beam with a full angular width at its half height of 1.81 angular minutes. A third, receiving slit, 0.04 mm wide, was located between the sample holder and a counter at a distance of 250 mm from the sample. A fourth slit, also located between the sample holder and the counter, was 0.4 mm wide and was located 90 mm from the receiving slit. The cathode filament and the slits were disposed vertically. The adjustable knife was adjusted by the micrometer on one side of the X-ray beam to a position such that an edge of the knife was located very close to the beam but did not touch it. The purpose of this adjustment is to cut background scattering from the edges of the collimating slit such that scattering is minimum at diffraction angles, 2 Ø, of 4–5 angular minutes and greater.

Test specimens were prepared by wrapping yarns around a metal sample frame having a thickness of 1 mm and a 12 mm×12 mm window. Yarns were stretched to remove their bulk, but without stretching the filaments thereof, in wrapping around the frame. For yarns having deniers of about 1400 to about 1800 g/9000 meters, the number of wraps around the sample frame was about 32. The frame was then installed in the specimen holder in the center of the goniometer with the wraps of yarn positioned so that the fiber axes were horizontally disposed and so that all fibers were impinged by the X-ray beam. Before each run the diffractometer was turned on and maintained at 45 kv and 150 ma for about 2 hours to stabilize the position of the X-ray beam. After preheating, the zero position for the system was established as the angular position of the center of the X-ray beam. The center of the beam is defined as the midpoint of the full angular width of the profile of the beam at half the height of the profile. The profile of the X-ray beam was measured at 45 kv and 150 ma using an attenuator. The small angle X-ray diffraction was measured by continuous scanning at a speed of 0.10 per minute in the range of diffraction angles, 2 Ø, between 5–10 and 120 angular minutes. Thus, time of scanning was about 20 minutes. This scanning was done for each sample three times for each of the fiber axis angles 0°, 10° and 20°. For each scan the Lorentz correction was applied and diffuse scattering was separated based on extrapolation of the diffuse scattering profile. Maximum intensity of the peak was determined from the height of the peak over the extrapolated diffuse scattering line. Usually, diffuse scattering did not change appreciably with changes in the angles at which fiber axes were disposed. The maximum intensities of the reflections for the different angles determined after application of the Lorentz correction and separation of diffuse scattering were used for the Formula (1) calculations.

For the 0° measurements, $\phi_m$ of the reflections was determined as the midpoint of the full angular widths of the reflections at half heights and was used for the determination of long periods, L, according to Formula (2). Apparent Average Microfibril Diameters were calculated by using Formulas (1) and (2) for angles, α, of 10° and 20°. An average value of the calculations at the two angles represents Apparent Average Microfibril Diameter of a sample.

To improve accuracy of the measurements, it is desirable to decrease the time of scanning for the three scans of each sample. This decreases the likelihood of changes in intensity of the X-ray beam from one scan of a sample to another. For this, after a long run with the fiber positioned at a 0° angle, scanning from 5–10 to 120 angular minutes was performed in three short scans at fiber angles of 0°, 10° and 20° in the short range of 2 Ø angles to measure in close proximity to the intensity maximums. Each of these scans was about three minutes. The long scans were used to separate diffuse scattering and to determine long periods, L. The short scans were used to determine $I_m(0)$ and $I_m(\alpha)$. The Lorentz correction was applied as above.

Wide-Angle X-Ray Diffraction

A Rigaku Rotaflex 0–20 diffractometer with rotating copper anode generator (the same generator which was used for small-angle measurements), operating at 150 mA and 45 kV, was used to obtain radial equatorial and meridional scans for measurements of total crystallinity. A standard nickel filter was employed for attenuating the $K_{62}$ component in the incident beam. The nominal wavelength of the $K_\alpha$ radiation was 1.5418 Å.

The radian scan was used to calculate percent crystallinity using the Ruland's method described in "X-Ray Diffraction Methods in Polymer Science" by L. E. Alexander (chapter 3), id. This method is preferred over other methods because it does not require any amorphous or crystalline standards. A flat layer of parallel yarns was wound on a sample-holder that was rotated at 60 revolutions per minute during the radial scan over the angular range of 5° to 75°, 20 rpm in the mode 0–20 motion (the sample and the counter are moved around the axis of goniometer with speed ratio 1:2). The typical fiber sample is made of 32 wraps of yarns distributed uniformly on 12 mm width.

Line focus, slit collimation and slit registration was used. The cathode filament was 0.5 mm wide and 10 mm long, the first (collimating) slit was 0.05 mm, the second (registration) slit was 0.3 mm, and the third slit (in front of the counter) was 0.6 mm. The anode—sample distance and the sample—registration slit distance were 185 mm. This resulted in the X-ray beam having angular width on half-of-height of 5.6 angular minutes, which was not more than ⅓–¼ of the corresponding width of the narrowest wide-angle X-ray reflections measured. Such a narrow beam is used to prevent significant widening of the reflections and promote accuracy of crystallinity measurements.

Rigaku's software, which used Ruland's method, was used to calculate crystallinity. The program makes corrections in the observed intensity for air scattering, Lorentz-polarization factor, and absorption. Air scattering corrections are made using scattering profile of air taken under the same conditions as the fiber samples. Linear absorption coefficient (9.416 cm$^{-1}$) and sample thickness values were used to make absorption corrections. The incoherent intensity is multiplied with the corresponding scaling factor and then subtracted from the observed intensity at all values of s (magnitude of the scattering vector, s=2 sin $\emptyset/\lambda$). The software has a standardized way of separating the crystalline peaks from the background of amorphous plus incoherent scattering. However, this procedure requires some guess and knowledge of the shape of this background in the regions where the crystalline peaks are superimposed.

The crystallinity calculation also requires choosing the range for different values of a weighting factor K, and Rigaku's software chooses the right value for which the crystallinity obtained is constant for any integration limits as long as the crystalline peak is included in that limit. Finally, the ratio of the corrected crystalline curve to the combined corrected profile yields the crystallinity value.

The results from this method are quite satisfactory, in terms of the consistency of this technique, due to the fact that at a constant weighting factor (K=2.73–2.77) was obtained for all the samples. Consistent K values are important to make comparisons between different samples of the same polymer.

EXAMPLE I

Crystalline polypropylene homopolymer having a nominal melt flow rate of 15 grams per 10 minutes according to ASTM D1238 condition B, obtained from Amoco Chemical Company, without stabilizers or additives, was extruded as a melt at 230° C. using a Davis & Standard extruder equipped with a barrier flight screw of 2.5 inch diameter and 30:1 length to diameter ratio. Molten resin was extruded through a spinneret having 144 circular holes each with a diameter of 0.62 millimeter and capillary length of 2.48 millimeters. The filaments were then solidified in a cross-flow quench zone of 2.5 meters with air at temperature of 17.5° C. flowing at a velocity of 125 feet/minute. The quenched filaments were brought together and then passed over two take-up rolls operating at 1095 meters/minute where one % by weight spin finish composed of an aqueous emulsion of fatty acid and Scotchguard® fluorochemical was applied using a slot applicator. Denier of the resulting yarn was 1650 grams/9000 meters.

The yarn was further processed on a draw-texturing machine (Neumag NPT 2000/6 from Neumunstersche Maschinen- und Apparatebau GMBH, Neumunster, Germany). The yarn was drawn between two heated roll pairs, fed into a texturizing jet, deposited on a sieve drum and taken off with a roll-idler pair through a yarn brake to a winder. The first draw roll pair ran at 667 meters/minute and was heated at 90° C. while the second draw roll pair ran at 1000 meters/minute and was heated at 125° C., thus providing a draw ratio of 1.5:1. The texturing jet air was heated at 140° C. and the jet air pressure was 6 bars. The yarn exited the jet and was deposited on a sieve drum to cool. The yarn was pulled from the sieve drum by take-off at 760 meters/minute to a winder operating at 776 meters/minute. Bulk of the yarn was about ten %.

The bulked yarn was subsequently wound into skeins having a circumference of about 36 inches and 122 wraps. Total weight of each skein was about 18 grams and bulk density was about 0.3 cm$^3$/g. Skeins were then heat treated by placing them in a relaxed state, for the times and at temperatures shown in Table III below, in a Blue M model OVA490A-3 forced air convection oven preheated to the temperatures shown in the table. Opening of the oven to place the skeins caused temperature drops of 15° C.; recovery to the set temperature took about 15 minutes. Accordingly, in the case of samples 1–5, the recovery time for heating to the set temperature served to condition and rebulk the yarn skeins for the subsequent, higher temperature heating. The skeins were analyzed by small angle X-ray diffraction to determine Apparent Average Microfibril Diameters and tested for Plug Crush Recoveries. Results are shown in Table III, with samples A–D being comparative fibers and yarns and sample 1–5 being in accordance with the invention.

TABLE III

| Sample | Heat Treatment (° C./Minutes) | Plug Crush Recovery(%) | Apparent Average Microfibril Diameter(Å) |
| --- | --- | --- | --- |
| A | — | 72 | 160 |
| B | 100/20 | 74 | 166 |
| C | 130/2 | 82 | 188 |
| D | 130/50 | 82 | 197 |
| 1 | 145/50 | 85 | 235 |
| 2 | 155/1 | 92 | 287 |
| 3 | 155/5 | 92 | 287 |
| 4 | 155/10 | 91 | 290 |
| 5 | 155/50 | 93 | 310 |

As seen from the table, Plug Crush Recoveries of at least 85% were achieved Apparent Average Microfibril Diameters of at least about 240 Å. It also can be seen from samples 1–5 that the results achieved when heating included exposures at both 140–145° C. and at 155° C. were better than that at 130 and 145° C. This example also illustrates an embodiment of the invented process in which heat treating was conducted using a forced air oven with hot air as heat transfer medium.

EXAMPLE II

Crystalline homopolymer polypropylene having a melt flow rate of 15 grams per 10 minutes obtained from Amoco Chemical Company in a blend with a concentrate of a beige pigment and ultraviolet-light stabilizers was extruded as a melt at 235° C. through a spinneret having two sets of 80 holes each with a delta cross-section having side measures of 0.84 millimeters. The filaments were solidified in a radial in-flow quench zone of 1.0 meter with flowing air at a temperature of 17.5° C. and a velocity of 100 feet/minute. The yarn was then passed over pretensioning rolls at 890 meters/minute where one % by weight of the spin finish used in Example I was applied using a slot applicator. The as-spun yarn was further processed on a draw-texturing machine (Neumag NPT 2000/6, Neumunstersche Maschinen- und Apparatebau GMBH, Neumunster, Germany) where the yarn was drawn between two heated roll pairs, fed into a texturizing jet, deposited on a sieve drum and taken off with a roll-idler pair through a yarn brake to a winder. The first draw roll pair ran at 900 meters/minute and was heated at 90° C. The second draw roll pair ran at 1800 meters/minute and was heated at 130° C. The texturing jet air was heated to 145° C. The yarn exited the jet and was deposited on a sieve drum to cool. The yarn was pulled from the sieve drum by the take-off at 1320 meters/minute to the winder running at 1340 meters/minute. Yarn bulk was ten %.

Two plies of yarn were cabled together on a carpet yarn cabler (American Volkmann Corporation, Charlotte, N.C.) with 4.5 twists per inch at a spindle speed of 6250 revolutions per minute.

The cabled yarn was annealed in a Blue M forced convection, hot air oven at 155° C. for 50 minute. The Apparent Average Microfibril Diameter determined by small angle X-ray diffraction was 277 Å. The cabled yarn had an average Plug Crush Recovery of 87.8%.

EXAMPLE III

Crystalline homopolymer polypropylene having a melt flow rate of 15 grams per 10 minutes obtained from Amoco Chemical Company in a blend with a concentrate of a blue pigment was extruded as a melt at 255° C. through a spinneret having two sets of 80 holes each with a delta cross-section with side measures of 0.84 millimeters and capillary length of about 2.5 millimeters. The yarn was solidified in a radial in-flow quench zone of 1.0 meter with flowing air at a temperature of 12° C. and velocity of 100 feet/minute. The yarn was passed over pretensioning rolls at 676 meters/minute where one % by weight of spin finish was applied. The as-spun yarn was further processed on a draw-texturing machine (Neumag NPT 2000/6, Neumunsterche Maschinen—und Apparatebau GMBH, Neumunster, Germany) where the yarn was drawn between two heated roll pairs, fed into a texturizing jet, laid on a sieve drum and taken off with a roll-idler through a yarn brake to a winder. The first roll pair ran at 680 meters/minute and was heated at 90° C. The second draw roll pair ran at 1700 meters/minute at a temperature of 130° C. The texturing jet air was heated to 165° C. The yarn was pulled from the sieve drum by the take-off at 1200 meters/minute to the winder running at 1220 meters/minute. The yarn bulk was ten %.

Two plies of the yarn were cabled together on a carpet yarn space cabler (American Volkmann Corporation, Charlotte, North Carolina) with 4.5 twists per inch at a spindle speed of 6250 revolutions per minute.

The untwisted and twisted cabled yarns were heat treated on a tape yarn line (American Barmag Corporation, Charlotte, N.C.) where the yarns were pulled off packages in a creel over a set of six rolls heated at 130° C. into a forced convection oven at 155° C. and were wound on packages. The residence times of the yarns traversing the roll stand were approximately two minutes and the residence times in the oven were one minute.

The untwisted BCF yarn had an average Plug Crush Recovery of 84.4% with a standard deviation of 2.7. Apparent Average Microfibril Diameter of the fibers of the BCF yarn was 294 Å determined by small angle X-ray diffraction. The cabled, twisted yarn had an average Plug Crush Recovery of 87.4% and Apparent Average Microfibril Diameter of 291 Å determined by small angle X-ray diffraction.

EXAMPLE IV

Using equipment as in Example I, crystalline homopolymer polypropylene having a melt flow rate of 15 grams per 10 minutes obtained from Amoco Chemical Company and a hindered amine ultraviolet light stabilizer, in an amount providing about 1.5 parts by weight per hundred parts by weight of the total composition, were extruded as a melt at 230° C. through a spinneret having two sets of 40 holes, each of delta-shaped cross-section with side lengths of 1.71 mm. The filaments were solidified in a cross-flow quench zone of 2.5 meters with flowing air at a temperature of about 12° C. and velocity of 120 feet/minute. The filaments were brought together and passed over take-up rolls operating at 1070 meters/minute where one weight % of the spin finish used in Example 1 was applied as in that Example. Denier of the resulting yarn was 1520 g/9000 meters.

The as-spun yarn was further processed on a draw-texturing machine (Neumag NPT 2000/6, Neumunsterche Maschinen- und Apparatebau GMBH, Neumunster, Germany) where the yarn was drawn between two heated, roll pairs, fed into a texturizing jet, deposited on a sieve drum and taken off with a roll-idler pair through a yarn brake to a winder. The first draw roll pair operated at 667 meters/minute and was heated at 90° C. The second draw roll pair operated at 900 meters/minute at a temperature of 125° C. The draw ratio was about 1.3:1. The texturing jet air was heated at 140° C. and jet air pressure was 9 bars. The yarn was pulled from the sieve drum by a take-off device operated at 690 meters/minute to a winder running at 700 meters/minute. Bulk level of the yarn was about ten %.

The yarn was then heat treated in a modified Superba twist-setting unit (Superba TVP35, American Superba Corporation, Charlotte, N.C.) using steam and hot water. The yarn was transported through the unit using a belt onto which the yarn was coiled. The belt was operated at 12.5 meters/minute. Yarn was first heated at 100° C. for 16 seconds using steam, then at 148° C. with saturated steam for 16 seconds, then at 153° C. in hot water for 29 seconds and finally at 153° C. with saturated steam for 13 seconds. Apparent Average Microfibril Diameter was 323 Å and Plug Crush Recovery was 84%.

Plug Crush Recovery for this yarn was somewhat lower than expected from its Apparent Average Microfibril Diameter; the yarn surface also exhibited surface glaze. These results are believed to be attributable to the use of the high temperature (148° C.) in the intermediate conditioning step prior to heating within 20° C. of the polypropylene melting temperature (168° C.).

EXAMPLE V

Crystalline homopolymer polypropylene with a melt flow rate of 15 grams per 10 minutes obtained from Amoco Chemical Company in a blend with a concentrate of a blue pigment and ultraviolet-light stabilizers was extruded as a melt at 255° C. through a spinneret with two sets of 80 holes, each with a delta cross-section having side measures of 0.84 millimeters. The yarn was solidified in a radial in-flow quench zone of 1 meter with flowing air at a temperature of 12° C. and velocity of 100 feet/minute. The yarn was passed over pretensioning rolls at 676 meters/minute where one % by weight of spin finish was applied. The as-spun yarn was further processed on a draw-texturing machine (Neumag NPT 2000/6, Neumunsterche Maschinen—und Apparatebau GMBH, Neumunster, Germany) where the yarn was drawn between two heated, roll pairs, fed into a texturizing jet, laid on a sieve drum and taken off with a roll-idler pair through a yarn brake to a winder. The first draw roll pair ran at 680 meters/minute and was heated at 90° C. The second draw roll pair ran at 1700 meters/minute at a temperature of 130° C. The texturing jet air was heated at 165° C. The yarn was pulled from the sieve drum by the take-off at 1200 meters/minute to the winder running 1220 meters/minute.

Two plies of the yarn were cabled together on a carpet yarn cabler (American Volkmann Corporation, Charlotte, N.C.) with 4.5 twists per inch at a spindle speed of 6250 revolutions per minute.

The cabled, twisted yarn was annealed in a steam autoclave at 155° C. for one minute. Apparent Average Microfibril Diameter determined by small angle X-ray diffraction was 298 Å. Plug Crush Recovery was 85%. The yarn was tufted into a carpet with a face weight of 30 oz. per square yard and 0.25 inch pile height. Compression testing of the carpet resulted in 86.5% recovery from compression.

Comparative Example 1

In this comparative example, heatsetting according to Example 2 of Canadian Patent No. 957,837 was applied to a twisted, 1450 denier, 2 ply, polypropylene carpet face yarn having compressional recovery of 65–70%.

The heatsetting was performed using two one meter long tubes with different diameters. The larger tube had a ¼ inch steam inlet. 30 holes, each ¹⁄₆₄ inch in diameter, were drilled at equal intervals along the length of the smaller tube. That tube was then placed inside the larger tube and the assembly was sealed at its ends to form a chamber between the tubes. Constricting cones were attached at each end of the tube assembly for the purpose of maintaining steam pressure. Yarn speed through the smaller tube was controlled by a set of godets located near each end of the tube assembly.

In a first set of experiments the tube assembly was pressured with steam to a temperature of 155° C. and pressure of 65 psig in the interior of the smaller tube. Yarns were passed through the smaller tube at speeds effective to provide residence times of about ¾, ½, ⅓ and ¹⁄₁₀ second. After heating all four samples exhibited significant loss of hand, bulkiness and aesthetics. None of the samples was acceptable as carpet face yarn.

In a second set of experiments, steam temperature in the smaller tube was lowered to 145° C. in an attempt to avoid loss of aesthetic properties, bulk and hand. Yarns were passed through the smaller tube at residence times of about 1 and ¼ second. While aesthetics, bulk and hand of both samples were retained, compressional recoveries of the samples were 58% and 62%, respectively.

Similar experiments were conducted using untwisted, bulked continuous filament polypropylene yarns. Again, the yarns treated at the higher temperatures were unacceptable due to melting. Yarns treated at lower temperatures lost all of their bulkiness.

This example demonstrates that steam temperatures of 155° C. caused unacceptable melting of polypropylene yarns regardless of residence time while temperatures of 145° C. did not yield improvements in compressional recovery. It also illustrates that without a conditioning treatment at 20–40° C. below the polypropylene melting point, heatsetting at temperatures near the melting point produces melting and loss of desirable yarn properties.

Comparative Example 2

Samples of commercially available, bulked continuous filament polypropylene carpet face yarns were heatset in a relaxed state for 50 minutes in an air oven at 155° C. and then tested for compressional recovery by the Plug Crush Recovery test. Five samples of each yarn were tested; results reported below are an average of the individual test results.

TABLE CE2

| Yarn Sample(denier) | Plug Crush Recovery(%) |
| --- | --- |
| Beaulieu Red (1645) | 79.8 |
| Beaulieu Red (2043) | 76.3 |
| Beaulieu Blue (2035) | 80.7 |
| Beaulieu Beige (2051) | 79.7 |
| Shaw Light Red (1610) | 79.4 |
| Hercules Brown/Gold (2293) | 80.3 |
| Genesis (No Heat Treatment) | ~73 |

As can be seen from the foregoing table, after heatsetting at 155° C., the yarn samples exhibited Plug Crush Recoveries in the range of about 70 to 80%.

Comparative Example 3

In an attempt to prepare yarn according to the teachings of U.S. Pat. No. 3,152,380, a polypropylene obtained from Amoco Chemical Company with 0.15 weight % titanium dioxide added was melt spun at 238° C. through two spinnerettes, each with 72 round holes with diameters of 0.76 mm, at a rate of 119 meters per minute. The filaments were quenched and drawn to a draw ratio of 3.25:1 at a temperature of 130° C. using a series of rolls. The resulting filaments had deniers of 15. The yarns were bulked and then heated in an untensioned state at various temperatures in an autoclave for ten minutes. Plug Crush Recoveries of the yarns were then measured. Heating temperatures and Plug Crush Recovery test results are reported below.

TABLE CE3

| Yarn Sample | Heatset Temperature (° C.) | PCR(%) |
| --- | --- | --- |
| 1 | 140 | 61.4 |
| 2 | 150 | 73.8 |
| 3 | 155 | 76.5 |
| 4 | 158 | 75.5 |

As can be seen from the table, none of the samples had a Plug Crush Recovery approaching 85%.

Comparative Example 4

In an attempt to follow the teachings of U.S. Pat. No. 3,256,258, polypropylene with a nominal melt flow rate of 15 g/10 min. obtained from Amoco Chemical Company was melt spun at a melt temperature of 230° C. through a spinnerette with 0.020 inch holes maintained at 238° C. at a rate of 480 meters per minute (525 yards/min.), quenched, drawn and bulked. Bulked yarns were then heated without tension at various temperatures and Plug Crush Recoveries of the yarns were measured. Heating times and temperatures and average of five Plug Crush Recovery measurements for each sample are reported below.

TABLE CE4

| Yarn Sample | Temperature (° C.) | Time (Min.) | PCR(%) |
| --- | --- | --- | --- |
| 1 | 125 | 10 | 65.4 |
| 2 | 145 | 50 | 70.1 |
| 3 | 155 | 50 | 80.9 |

As can be seen from the table, Plug Crush Recoveries of these sample were well below 85%.

Comparative Example 5

Sample of commercial bulked continuous filament polypropylene yarns sold Hercules and Wellington were analyzed for Plug Crush Recovery and Apparent Average Microfibril Diameter. Results are reported

| Yarn Sample | Denier | Plug Crush Recovery(%) | Apparent Average Microfibril Diameter(Å) |
| --- | --- | --- | --- |
| Hercules | 1336 | 73.6 | 203 |
| Wellington | 2241 | 79.5 | 138 |

Comparative Example 6

This example illustrates Apparent Average Microfibril Diameter and Plug Crush Recovery properties of bulked continuous filament polypropylene yarns prepared by conventional melt spinning techniques without heatsetting.

Polypropylene having a nominal melt flow rate of 16.5 g/10 min. was melt spun at a melt pressure of 1460 psi and temperature settings of 400–435° F. in a multi-zoned extruder. The resulting filaments were quenched with 15° C. air and then a spin finish was applied. The filaments were then textured by passage through a fluid jet operated at air pressure of 5 bar, stubbing pressure of 0.5 bar, vacuum drum speed of 8.3 and air temperature of 320–356° F. The yarn was then drawn to a draw ratio of about 2.5–3 by passage over a series of rolls operated, in sequence, at 300, 307, 800 and 832 m/min. and 225, 275, 258 and 240° F. Yarns were taken up at 345 m/min. The resulting yarn had denier of 1394.

Plug Crush Recovery and Apparent Average Microfibril Diameter of the yarn were 70–75% and 141 Å, respectively.

We claim:

1. A process for treating a textile product comprising providing a textile product comprising fibers comprising propylene polymer and heating the textile product with the fibers in a substantially relaxed state at at least one heat treating temperature below but within about 20° C. of the melting temperature of the propylene polymer, wherein said fibers comprising propylene polymer are selected from the group consisting of (1) fibers characterized by small angle X-ray diffraction such that an average of $$\frac{L}{1.03\tan\alpha} \times \sqrt{-\log\frac{I_m(\alpha)}{I_m(0)}}$$

with the fiber positioned such that its longitudinal axis is inclined at angles, α, of 10° and 20° from a perpendicular to the X-ray beam is at least about 200 Å, wherein $I_m(0)$ is maximum intensity of the small angle X-ray meridional reflection with the fiber positioned such that its longitudinal axis is perpendicular to the X-ray beam, $I_m(\alpha)$ is maximum intensity of the small angle X-ray meridional reflection with the fiber positioned such that its longitudinal axis is inclined at the angle, α, from the perpendicular to the X-ray beam, $$L = \frac{1.5418\text{Å}}{\phi_m}; \text{ and}$$

$\phi_m$ is an angular position, in radians, of the center of the small angle X-ray meridional reflection at half height relative to the center of the incident X-ray beam with the fiber positioned such that its longitudinal axis is perpendicular to the X-ray beam, and wherein the small angle X-ray diffraction is conducted with CuKα radiation having a wavelength of 1.5418 Å and the X-ray beam is slit collimated to an angular width at half height of 1.81 minutes, and (2) melt spun, oriented fibers heated at at least one temperature lower than the heat treating temperature and about 20 to about 40° C. below the melting temperature of the propylene polymer with the fibers in a substantially relaxed state.

2. The process of claim 1 wherein the propylene polymer is homopolymer polypropylene.

3. The process of claim 1 wherein the textile product comprises yarn.

4. The process of claim 3 wherein the textile product is bulked continuous multifilament yarn.

5. The process of claim 4 wherein the propylene polymer is homopolymer polypropylene.

6. The process of claim 5 wherein the heat treating temperature is about 150 to about 165° C.

7. The process of claim 1 wherein the fibers comprising propylene polymer are melt spun, oriented fibers in the form of bulked, continuous multifilament yarn heated in a substantially relaxed state at at least one temperature lower than the heat treating temperature and about 20 to about 40° C. below the melting temperature of the propylene polymer.

8. The process of claim 7 wherein the propylene polymer is homopolymer polypropylene.

9. The process of claim 8 wherein the heat treating temperature is about 150 to about 165° C.

10. The process of claim 1 wherein the heat treating is conducted using circulating air as a heat transfer medium.

11. The process of claim 1 wherein the heat treating is conducted using steam as a heat transfer medium.

12. The process of claim 1 wherein the heat treating is conducted using hot water as a heat transfer medium.

13. A process for preparing a bulked, continuous multifilament yarn comprising spinning molten thermoplastic resin comprising propylene polymer at about 205 to about 270° C. through a plurality of orifices to form filaments, quenching the molten filaments, drawing the quenched filaments at a draw ratio of about 1.2:1 to about 3.5:1, texturing the filaments to provide a bulk level of about 2 to about 20%; heating the bulked filaments in a substantially relaxed state at at least one temperature about 20 to about 40° C. below the melting temperature of the propylene polymer, and heating the bulked filaments in a substantially relaxed state at at least one higher temperature below but within about 20° C. of the melting temperature of the propylene polymer.

14. The process of claim 13 wherein the propylene polymer comprises homopolymer polypropylene.

15. The process of claim 14 wherein the higher temperature is about 5 to about 15° C. below the melting temperature.

16. The process of claim 13 in which the yarn is converted to a textile product in at least one conversion step conducted after texturing the filaments.

17. The process of claim 16 wherein the conversion step is conducted prior to heating at at least one temperature about 20 to about 40° C. below the melting temperature.

18. The process of claim 16 wherein the conversion step is conducted after heating at at least one temperature about 20 to about 40° C. below the melting temperature but before heating at the higher temperature.

19. The process of claim 16 wherein the conversion step is conducted after heating at the higher temperature.

20. The process of claim 13 wherein heating at at least one temperature about 20 to about 40° C. below the melting temperature and heating at the higher temperature are conducted by passing the yarn in a substantially relaxed state through apparatus comprising a chamber equipped with means for circulating a heat transfer medium therethrough and having at least two compartments capable of being maintained at independent temperatures.

21. The process of claim 20 wherein the heat transfer medium is hot air.

22. The process of claim 20 wherein the heat transfer medium comprises steam.

23. The process of claim 20 wherein the heat transfer medium comprises hot water.

* * * * *